(12) United States Patent
Hattori et al.

(10) Patent No.: US 7,614,796 B2
(45) Date of Patent: Nov. 10, 2009

(54) WHEEL SUPPORT BEARING ASSEMBLY

(75) Inventors: Naoshi Hattori, Iwata (JP); Kazuo Komori, Iwata (JP)

(73) Assignee: NTN Corporation, Osaka (JP)

( * ) Notice: Subject to any disclaimer, the term of this patent is extended or adjusted under 35 U.S.C. 154(b) by 455 days.

(21) Appl. No.: 11/431,528

(22) Filed: May 11, 2006

(65) Prior Publication Data

US 2006/0269181 A1   Nov. 30, 2006

(30) Foreign Application Priority Data

| May 12, 2005 | (JP) | ............................ | 2005-140451 |
| May 12, 2005 | (JP) | ............................ | 2005-140452 |
| May 12, 2005 | (JP) | ............................ | 2005-140453 |

(51) Int. Cl.
    *F16C 13/00* (2006.01)
(52) U.S. Cl. .................................................. 384/544
(58) Field of Classification Search ................ 384/544, 384/589

See application file for complete search history.

(56) References Cited

U.S. PATENT DOCUMENTS

| 1,754,892 | A | * | 4/1930 | Hughes ........................ 384/544 |
| 3,157,442 | A | * | 11/1964 | Gaubatz ...................... 384/540 |
| 4,333,695 | A | * | 6/1982 | Evans .......................... 384/562 |
| 4,668,111 | A |   | 5/1987 | Kapaan |
| 4,958,944 | A | * | 9/1990 | Hofmann et al. ............. 384/512 |
| 5,454,647 | A |   | 10/1995 | Otto |
| 5,727,886 | A |   | 3/1998 | Hata et al. |
| 6,196,727 | B1 | * | 3/2001 | Kawamura ................... 384/544 |
| 6,481,898 | B1 |   | 11/2002 | Yakura et al. |
| 6,491,440 | B1 |   | 12/2002 | Sahashi et al. |
| 6,637,944 | B2 |   | 10/2003 | Sahashi et al. |
| 6,729,769 | B2 |   | 5/2004 | Sahashi et al. |
| 7,413,349 | B2 | * | 8/2008 | Niebling et al. ............. 384/544 |
| 2002/0110300 | A1 |   | 8/2002 | Meeker et al. |
| 2004/0131295 | A1 |   | 7/2004 | Shibuya |
| 2005/0111771 | A1 | * | 5/2005 | Shevket ....................... 384/544 |

(Continued)

FOREIGN PATENT DOCUMENTS

EP         0 687 825         12/1995

(Continued)

OTHER PUBLICATIONS

Office Action mailed on May 27, 2008 and issued in corresponding Japanese Patent Application No. 2006-206096.

(Continued)

*Primary Examiner*—Thomas R Hannon

(57) ABSTRACT

A wheel support bearing assembly, in which the rigidity of an outboard portion thereof can be increased without increasing the weight of the bearing assembly. The wheel support bearing assembly includes outer and inner members and inboard and outboard rows of rolling elements interposed between outboard and inboard raceways defined in the outer and inner members confronting each other. The inner member includes a hub axle having a wheel fitting flange on an outboard side thereof, and an inner race member mounted on an inboard end thereof. The hub axle has an outer diameter measured at a point intermediate between the inboard and outboard rows of rolling elements that is greater than the minimum diameter of the raceway on the inboard side. A pitch circle diameter of the outboard row of rolling elements is greater than the pitch circle diameter of the inboard row of rolling elements.

12 Claims, 10 Drawing Sheets

U.S. PATENT DOCUMENTS

2005/0185871 A1 * 8/2005 Morita et al. ............... 384/544

FOREIGN PATENT DOCUMENTS

| | | |
|---|---|---|
| JP | 57-006125 | 1/1982 |
| JP | 61-030504 | 2/1986 |
| JP | 63-166601 | 7/1988 |
| JP | 01-190586 | 7/1989 |
| JP | 2000-289403 | 10/2000 |
| JP | 2000-513661 | 10/2000 |
| JP | 2001-130209 | 5/2001 |
| JP | 2001-213111 | 8/2001 |
| JP | 2001-246905 A | 9/2001 |
| JP | 2001-289252 | 10/2001 |
| JP | 2002-061663 A | 2/2002 |
| JP | 2002-295505 | 10/2002 |
| JP | 2003-232343 | 8/2003 |
| JP | 2004-108449 | 4/2004 |
| JP | 2004-345439 | 12/2004 |
| JP | 2005-081856 | 3/2005 |
| JP | 2005-106213 | 4/2005 |
| JP | 2005-291457 | 10/2005 |
| WO | WO 98/58762 | 12/1998 |
| WO | WO 00/37813 | 6/2000 |
| WO | WO 2004/022992 | 3/2004 |
| WO | WO 2005/065077 | 7/2005 |

OTHER PUBLICATIONS

Extended European Search Report, mailed Dec. 20, 2007 and issued in corresponding European Patent Application No. 06009633.6-2424.

Japanese Patent Office Action, mailed Mar. 13, 2007 and issued in corresponding Japanese Patent Application No. 2005-140451.

Japanese Office Action (Notice of Rejection) issued Dec. 12, 2006 in correspondence to Japanese Patent Application No. JP 2005-140451.

Japanese Office Action (Notice of Rejection) issued Dec. 12, 2006 in correspondence to Japanese Patent Application No. JP 2006-206096.

Japanese Office Action (Notice of Rejection) issued Dec. 12, 2006 in correspondence to Japanese Patent Application No. JP 2006-206097.

Japanese Office Action issued on Dec. 9, 2008 in corresponding Japanese Patent Application 2006-206096.

Japanese Patent Office Action, mailed Aug. 12, 2008 and issued in corresponding Japanese Patent Application No. 2006-206096.

* cited by examiner

WHEEL SUPPORT BEARING ASSEMBLY

CROSS-REFERENCE TO RELATED APPLICATIONS

This application claims the benefit of Japanese Patent Application Nos. 2005-140451, 2005-140452, and 2005-140453, filed Dec. 5, 2005, in the Japanese Intellectual Property Office, the disclosure of which is incorporated herein by reference.

BACKGROUND OF THE INVENTION

1. Field of the Invention

The present invention generally relates to a bearing assembly and, more particularly, to a wheel support bearing assembly utilizable in automotive vehicles.

2. Description of the Prior Art

It is quite well known that automotive wheels are rotatably supported by suspension systems through respective wheel support bearing assemblies. Those wheel support bearing assemblies are generally required to have a high load carrying capacity and a high rigidity. Also, to increase, for example, the mileage, demands have intensively been made to reduce the weight of component parts used in the automotive vehicles, and the wheel support bearing assembly is not an exception to that.

While most of the conventional wheel support bearing assemblies satisfy the requirement of a high load carrying capacity, it is often considered that the conventional wheel support bearing assemblies would hardly exhibit a sufficient rigidity during cornering of an automotive vehicle. Also, it is recognized that in order to allow the automotive vehicle to travel in a stabilized fashion, the rigidity of the bearing assembly that is exhibited during the cornering must be increased.

The wheel support bearing assemblies are generally employed each in the form of a multi-row bearing and are so designed that during the forward run of the automotive vehicle, the weight of the automotive vehicle may act on an intermediate portion of each multi-row bearing assemblies. However, during the cornering, the moment load tending to incline a hub flange is generated under the influence of the lateral force acting on the respective wheel tire. For this reason, the rigidity of a portion of the multi-row bearing assembly in the region of one of the circular rows of rolling elements such as balls, which is on an outboard side of the bearing assembly, is required to be increased.

The wheel support bearing assembly, in which the rigidity of that portion thereof in the region of one of the circular rows of rolling elements that is on an outboard side of the bearing assembly, has been increased is well suggested in, for example, the Japanese Laid-open Patent Publication No. 2003-232343 and is shown in FIG. 11. Referring to FIG. 11, the wheel support bearing assembly shown therein has two, outboard and inboard, rows Lo and Li of rolling elements 7 and 8 that are shown on left and right sides as viewed therein. Of those rows of the rolling elements, the outboard row Lo includes the rolling elements 7 so arranged as to depict the PCD (pitch circle diameter) greater than that depicted by the inboard row Li of the rolling elements 8. This Japanese patent document also discloses, as an alternative embodiment, the use of the rolling elements 7 of the outboard row Lo, that are greater in number than that of the rolling elements 8 of the inboard row Li, instead of the different PCDs used.

To increase the PCD of the outboard row Lo of the rolling elements 7 to a value greater than that of the inboard row Li of the rolling element or to increase the number of the rolling elements 7 in the outboard row Lo to a value greater than that of the rolling elements 8 in the inboard row Li, such as exemplified by the above mentioned Japanese patent document, brings about an excellent effect of increasing the bearing rigidity in an outboard region of the bearing assembly. Also, since according to the above mentioned Japanese patent document, increase of the pitch circle diameter (PCD) or the number of the rolling elements is effected not in both of the outboard and inboard rows Lo and Li, but only in the outboard row Lo, the overall size and the weight of the bearing assembly do not increase.

However, in the conventional wheel support bearing assemblies, no sufficient consideration has been paid to the shape of the hub axle and, therefore, the effect of increasing the rigidity in the outboard region has not yet been increased satisfactorily. By way of example, in the case of the wheel support bearing assembly shown in FIG. 11, the hub axle 18 that is coupled with the inner race member 19 for rotation together therewith is so configured and so designed that the position Q, at which the inner race member 19 is held in abutment with a shoulder of the inner race mount in the hub axle 18, is at a position on an outboard side of the point intermediate of the ball span as measured between the balls 7 of the outboard row Lo and the balls 8 of the inboard row Li and that an shaft member 18a of the hub axle 18 on an inboard side of the position Q may have an outer diameter equal to that of a reduced diameter portion of the inner race member 19. Because of this unique design, the outer diameter of the shaft member 18a of the hub axle 18 abruptly decreases at a location somewhat on an inboard side of the outboard raceway 5, with the consequence that the rigidity of an outboard end portion of the hub axle 18 is insufficient.

Even on the inboard side, increase of the bearing rigidity is desired in order to facilitate the stabilized run. On the inboard side, it is quite often that the bearing dimensions are limited in the face of their relation with surrounding components and difficulty is often encountered with in increasing the bearing rigidity. In particular, in the case of the wheel support bearing assembly of an inner race rotating type, since an outer member having an inner peripheral surface formed with raceways has to be connected with a knuckle in a fashion engaged with an inner peripheral surface of the knuckle and, therefore, there is no way other than to increase the rigidity with due consideration paid to the limitation brought about by the inner diameter of the knuckle.

SUMMARY OF THE INVENTION

An object of the present invention is therefore to provide an improved wheel support bearing assembly, in which the rigidity of an outboard portion thereof can be increased without incurring an increase of the weight of the bearing assembly.

Another object of the present invention is to provide an improved wheel support bearing assembly, in which not only is the rigidity of the outboard portion increased, but the rigidity of the inboard portion is also increased while the bearing diameter is limited and, also, the rolling fatigue life can be secured and which is advantageous in terms of cost.

In order to accomplish the foregoing objects, the wheel support bearing assembly herein provided in accordance with one aspect thereof includes an outer member having an inner periphery formed with a plurality of raceways, and an outer periphery formed with a vehicle body mounting portion, an inner member having an outer periphery formed with raceways cooperable and aligned with the raceways in the outer member and rows of rolling elements interposed between the raceways in the outer member and the raceway in the inner member, respectively. The outer periphery of one of the outer and inner members is formed with a wheel fitting hub flange defined on an outboard side. The inner member includes a hub axle, which has an inner race mount defined on an inboard side and radially inwardly stepped to provide a reduced diameter, and an inner race member mounted on the inner race mount, with the raceways in the inner member defined in the hub axle and the inner race member, respectively. The outer diameter of the hub axle as measured at a point intermediate between the rows of the rolling elements on the outboard and inboard sides, respectively, is chosen to be greater than a minimum available diameter of the raceway on the inboard side.

According to the present invention, since the outer diameter of the hub axle as measured at a point intermediate between the rows of the rolling elements on the outboard and inboard sides, respectively, is chosen to be greater than a minimum available diameter of the raceway on the inboard side, the rigidity of the hub axle against the moment load acting on the bearing assembly during run of the automotive vehicle can be increased.

Although in the conventional bearing assembly of a similar kind, the outer diameter of the hub axle as measured at a location intermediate between the outboard and inboard rows of the rolling element is so chosen as to be equal to the minimum diameter of the inboard raceway groove, increase of the outer diameter of the hub axle such as achieved in the present invention contributes to increase of the rigidity. Increase in diameter and wall thickness in various parts of the bearing assembly appears to lead to increase of the rigidity, but results of the analysis conducted have shown that increase of the outer diameter of the hub axle at a location intermediate between the rolling elements on the outboard and inboard sides, respectively, is effective to increase the rigidity against the above discussed moment load. Accordingly, when the outer diameter referred to above is increased, the rigidity can advantageously be increased without incurring an increase of the weight even though the wall thickness of other portions of the bearing assembly is depleted.

In a preferred embodiment of the present invention, the diameter of the pitch circle depicted by the rolling elements of the row on the outboard side may be chosen to be greater than that depicted by the rolling elements of the row on the inboard side.

Not only can increase of the PCD in the row of the rolling elements on the outboard side result in increase of the bearing rigidity of an outboard region of the bearing assembly, but facilitates the design of increasing the outer diameter of that portion of the hub axle intermediate between the rows of the rolling elements on the outboard and inboard sides, respectively. In other words, since even though that portion of the hub axle intermediate between the rows of the rolling elements on the outboard and inboard sides is increased to a value greater than the diameter of the raceway for the row of the rolling elements on the inboard side, it can still be smaller than the diameter of the raceway for the row of the rolling elements on the outboard side and, therefore, there is no possibility that incorporation of the rolling elements of the row on the outboard side onto the associated raceway in the hub axle may be hampered. For this reason, without the incorporation of the rolling elements being hampered, the outer diameter of the hub axle intermediate between the rows of the rolling elements on the outboard and inboard sides can advantageously increased.

For depleting the material used to form the bearing assembly to reduce the weight of the latter as much as possible, a thinned wall portion may be defined in a portion of the inner peripheral surface of the outer member between the raceways.

According to the analytical results, it has been found that depletion of that portion of the inner peripheral surface of the outer member between the raceways on the outboard and inboard sides, respectively, brings about little influence on the bearing rigidity and, therefore, the provision of the thinned wall portion in that portion of the inner peripheral surface in the form of a circumferentially extending groove does not largely affect the bearing rigidity. Accordingly, the use of the thinned wall portion in that portion of the outer member between the rows of the rolling elements on the outboard and inboard sides while the outer diameter of that portion of the hub axle intermediate between the rows of the rolling elements on the outboard and inboard sides is increased would not result in increase of the weight of the bearing assembly and will result in increase of the bearing rigidity of the outboard region of the bearing assembly.

For additionally depleting the material used to form the bearing assembly to reduce the weight of the latter as much as possible, the hub axle may have an axial recess defined therein so as to extend axially inwardly from an outboard end face thereof to deplete a wall material. This recess has a depth enough to allow the axial recess to extend towards the inboard side past an axial position of the center of the rolling element in the hub axle.

Formation of the axial recess in the hub axle described above brings about little influence on the reduction of the rigidity of the hub axle. Where the outer diameter of that portion of the hub axle intermediate between the rows of the rolling elements on the outboard and inboard sides is increased as hereinbefore described, the axial recess in the hub axle can have a large depth and, therefore, without incurring an undesirable increase of the weight, the bearing rigidity of the outboard region can be increased.

In another preferred embodiment of the present invention, a portion of the raceway in the hub axle adjacent the inboard side may be formed with a varying diameter portion of a diameter progressively decreasing to a value smaller than the minimum diameter of this raceway in the hub axle. In this case, the varying diameter portion may preferably have an arcuate sectional shape, having a radius of curvature thereof greater than the radius of curvature of a sectional shape of the raceway in the hub axle. Also, the varying diameter portion may be of a shape representing a tapered shape.

Where that portion of the outer peripheral surface of the hub axle adjacent the inboard side is formed with the varying diameter portion of a diameter progressively decreasing to a value smaller than the minimum diameter of the raceway in the hub axle, the hub axle can be made lightweight as a result of the reduction of the outer diameter of the hub axle. If the diameter of the varying diameter portion changes abruptly, reduction of the rigidity of the outboard region of the hub axle may result in, but the progressively varying diameter is effective to avoid an undesirable increase of the weight while enhancing the rigidity of the outboard region of the hub axle.

If the varying diameter portion is so shaped as to represent the arcuate sectional shape with its radius of curvature greater than that of the sectional shape of the raceway in the hub axle, the rigidity of the outboard region of the hub axle can further be increased.

Also in a further preferred embodiment of the present invention, the rolling elements may be balls, in which case the diameter of the pitch circle depicted by the balls of the row on the outboard side is preferably greater than that depicted by the balls of the row on the inboard side, the balls of the row on the outboard side preferably has the same diameter as that of the balls of the row on the inboard side, and the number of the balls in the row on the outboard side is preferably greater than that of the balls in the row on the inboard side. At the same time, the ratio (d/PCDi) of the diameter d of the balls relative to the pitch circle diameter PCDi in the row of the balls on the inboard side is preferably chosen to be within the range of 0.14 to 0.25.

According to the foregoing construction, since the PCD in the row of the balls on the outboard side is so chosen as to be greater than the PCD in the balls on the inboard side, the rigidity of the portion of the bearing assembly on the outboard side can be increased. Also, the use of the balls of the row on the outboard side, that is greater than that on the inboard side is also effective to further increase the rigidity of the bearing portion on the outboard side. Specifically, while the rigidity of the bearing portion on the outboard side is increased in the manner described above, selection of the ratio (d/PCDi) of the diameter d of the balls relative to the pitch circle diameter PCDi in the row of the balls on the inboard side within the range of 0.14 to 0.25 is effective to increase the rigidity on the inboard side and also to secure the rolling fatigue life.

In other words, if for a given pitch circle diameter PCDi, the ball diameter d is reduced to allow the number of the balls used to increase, i.e. points of supports increase, accompanied by increase of the bearing rigidity. In terms of the increase of the rigidity, the balls preferably have as small a diameter as possible. However, with decrease of the ball diameter, the rolling fatigue life decreases. As results of the analysis conducted to determine the relation between the pitch circle diameter PCDi and the ball diameter d, it has been found that if the ratio d/PCDi is greater than 0.25, the rigidity required in the wheel support bearing cannot be increased, but if the ratio d/PCDi is smaller than 0.14, the rolling fatigue life required in the wheel support bearing assembly is insufficient.

Accordingly, selection of the ratio d/PCDi within the range of 0.14 and 0.25, that is, $0.14 \leq (d/PCDi) \leq 0.25$, is effective to increase the rigidity and also the rolling fatigue life at the same time.

In the conventional wheel support bearing assembly, the ball diameter is large relative to the pitch circle diameter PCDi and, therefore, it is designed to have a sufficient rolling fatigue life, but the rigidity is insufficient. However, the present invention as represented by the foregoing construction is intended to eliminate such a problem inherent in the conventional wheel support bearing assembly and, hence, to optimize the relationship between the rigidity and the rolling fatigue life.

Specifically, since in the outboard side, the balls of the same ball diameter d as that in the inboard side and the greater pitch circle diameter PCD is employed, the ratio d/PCDi in the outboard side is smaller than that in the inboard side. However, since the outboard side has a latitude in a quantity corresponding to the increased pitch circle diameter PCD and makes use of the balls of the same diameter as that in the inboard side, the sufficient rolling fatigue life can be secured. If the balls in the outboard side has the same ball diameter as that in the inboard side, the balls of the same standard can be employed and, as compared with the use of the balls of the different diameters, advantages can be obtained in productivity and cost.

The wheel support bearing assembly of the above described construction is particularly advantageous in that, in consideration of the respective conditions of load on the outboard and inboard sides, the rigidity in the outboard side is increased and rigidity in the inboard side is also increased with the limited bearing diameter and, also, the rolling fatigue life can be obtained. Additionally, merits can be found in terms of cost since the ball diameter of the balls on the outboard side and the ball diameter of the balls on the inboard side are chosen to be the same.

In a still further preferred embodiment of the present invention, the inner member may have the wheel fitting flange, the outer member may have a knuckle mount defined on the inboard side for engagement with a knuckle of a suspension system, and the raceway in the outer member on the inboard side may be in its entirety partly held in overlapping relation with an axial range in which the knuckle mount is defined.

In the case of the bearing assembly, in which the raceway on the inboard side is defined in the inner peripheral surface of the knuckle mount defined in the outer member, the outer diameter of the knuckle mount in the outer member is limited by the presence of the knuckle and the inner diameter of the raceway in the inner surface of the knuckle mount is correspondingly limited. Because of this, this structural feature is intended to enhance effects of increasing the rigidity even on the inboard side with the limited bearing diameter as well as on the outboard side and also securing the rolling fatigue life.

The foregoing effects will be effectively exhibited when the inner member is made up of the hub axle having the hub flange formed in an outboard end for the mounting of the vehicle wheel and also having a step-shaped reduced diameter portion defined in a portion of the outer surface in the hub axle adjacent the inboard end, which varying diameter portion has an arcuate sectional shape of a diameter progressively decreasing towards the inboard side, and an inner race member mounted on the inner race mount.

In a yet further preferred embodiment of the present invention, the rolling elements may be balls, the inner member may have the wheel fitting hub flange, the outer member may have a knuckle mount defined on the inboard side for engagement with a knuckle of a suspension system, and the raceway in the outer member on the inboard side may be in its entirety or partly held in overlapping relation with an axial range in which the knuckle mount is defined, in which case the diameter of the pitch circle depicted by the balls of the row on the outboard side is greater than that depicted by the balls of the row on the inboard side, the balls of the row on the outboard side has the same diameter as that of the balls the row on the inboard side, the number of the balls in the row on the outboard side is greater than that of the balls in the row on the inboard side, and the ratio (PCDi/D) of the pitch circle diameter PCDi in the row of the balls on the inboard side relative to the outer diameter D of the knuckle mount in the outer member is chosen to be within the range of 0.66 to 0.80.

According to the above structural feature, since the PCD of the row of the balls on the outboard side is chosen to be greater than that of the row of the balls on the inboard side, the rigidity of the outboard region of the bearing assembly can be increased. Also, since the number of the balls on the outboard side is chosen to be greater than that on the inboard side, the rigidity of the outboard portion can further be increased.

Since the present invention is such that while the rigidity on the outboard side is increased, the ratio (PCDi/D) of the pitch circle diameter PCDi of the row of the balls on the inboard side relative to the outer diameter D of the knuckle mount in the outer member is chosen to be within the range of 0.66 to 0.80, increase of the rigidity on the inboard side and the rolling fatigue life can be secured.

In other words, the outer diameter D of the knuckle mount in the outer member takes a fixed value as the required dimension according to the bearing design. For this reason, it is necessary to increase the rigidity and to secure the rolling fatigue life when the particular outer diameter D is employed in the knuckle mount.

The pitch circle diameter PCDi referred to above is a value equal to the difference between the inner diameter D4 of the raceway on the inboard side less the ball diameter d and, therefore, the smaller the ball diameter d, the more close the centers of the balls to the inner peripheral surfaces of the raceway and, hence, the more close the value of the pitch circle diameter PCDi to the value of the inner diameter D4 of the raceway. Since the raceway on the inboard side lies on the inner periphery of the knuckle, the inner diameter D4 of the raceway on the inboard side is of a constant value expressed by D4=D−2×t, if the outer diameter D of the knuckle mount is fixed and the wall thickness t of the outer periphery of the raceway in the outer member is of a large value available to the extent it does not exceed the minimum required wall thickness.

If the inner diameter D4 of the raceway is fixed, the pitch circle diameter PCDi (=D4−d) depends on the ball diameter d. If the outer diameter D of the knuckle mount is assumed to be fixed, the ratio PCDi/D depends on the ball diameter d and, hence, the smaller the balls, the greater the ratio PCDi/D.

If the ball diameter d is reduced, the number of the balls can be increased, resulting in increase of the support points, and therefore the bearing rigidity increases. For this reason, in terms of the increase of the rigidity, the ball diameter of a relatively small value is preferred.

Assuming that the outer diameter D of the knuckle mount is fixed and the required wall thickness t of the outer periphery of the raceway is also fixed, that is, the inner diameter D4 of the raceway is fixed, the relation between the rolling fatigue life and the rigidity was determined relying on the analysis. As a result thereof, it has been found that if the ratio PCDi/D is not greater than 0.66, the rigidity in the wheel support bearing assembly does not increase and, on the other hand, if the ratio PCDi/D is not smaller than 0.80, the rolling fatigue life of the wheel support bearing assembly is insufficient. Accordingly, if the ratio PCDi/D is selected to be within the range of 0.66 to 0.80, the rolling fatigue life can be secured and, at the same time, the rigidity can also be increased.

In the conventional wheel support bearing assembly, the ratio PCDi/D is smaller than 0.66 and the ball diameter is large relative to the outer diameter D of the knuckle mount and, therefore, it is designed to have a sufficient rolling fatigue life, but the rigidity is insufficient. However, this structural feature according to the present invention is intended to eliminate such a problem inherent in the conventional wheel support bearing assembly and, hence, to optimize the relationship between the rigidity and the rolling fatigue life.

The outboard side makes use of the balls of the same diameter as that of the balls on the inboard side and a relatively great pitch circle diameter PCD and, therefore, the outboard side has a latitude in terms of dimensions, and a satisfactory rolling fatigue life can be secured when the balls of the same diameter as that of the ball on the inboard side are employed. When the ball diameters of the balls on the outboard and inboard sides are the same, the balls of the same standard can be employed and, as compared with the use of the balls of the different diameters, advantages can be obtained in productivity and cost.

The wheel support bearing assembly of the above described structure is particularly advantageous in that depending on conditions of loads on the outboard and inboard sides, the rigidity of the region on the outboard is increased and also even on the inboard side, increase of the rigidity can be expected with the limited bearing diameter and the rolling fatigue life can be secured. The bearing assembly is also advantageous in terms of cost since the balls of the same diameters are used for the respective rows on the outboard and inboard sides.

In a yet still further preferred embodiment of the present invention, in the wheel support bearing assembly utilizing balls for the rolling elements, the inner member has the wheel fitting flange, the outer member has a knuckle mount defined on the inboard side for engagement with a knuckle of a suspension system, and the raceway in the outer member on the inboard side is in its entirety or partly held in overlapping relation with an axial range in which the knuckle mount is defined. In this wheel support bearing assembly, the inner diameter of the raceway on the inboard side in the outer member may be chosen to be a maximum available value sufficient to obtain a required wall thickness in a region between the knuckle mount and the raceway on the inboard side, the balls of the row on the inboard side may have a minimum available diameter sufficient to obtain a predetermined rolling fatigue life, the row of the balls on the outboard side may utilize the balls of the same diameter as that of the balls of the row on the inboard side, the diameter of the pitch circle depicted by the balls of the row on the outboard side may be greater than that depicted by the balls of the row on the inboard side, and the number of the balls in the row on the outboard side may be greater than that of the balls in the row on the inboard side.

According to this construction, since the inner diameter of the raceway on the inboard side in the outer member is chosen to be a maximum available value sufficient to obtain a required wall thickness in a region between the knuckle mount and the raceway on the inboard side and, at the same time, the balls of the row on the inboard side have a minimum available diameter sufficient to obtain a predetermined rolling fatigue life, the various component parts of the bearing assembly can have dimensional relation that is optimized to secure the rigidity and the rolling fatigue life corresponding to a limited outer diameter of the knuckle mount. Also, since the PCD in the row of the balls on the outboard side is chosen to be greater than that in the row of the balls on the inboard side, and the number of the balls in the row on the outboard side is greater than that of the balls in the row on the inboard side, the rigidity of the region on the outboard side can be increased. Considering that the balls of the same ball diameter are used to form the rows of the balls on the outboard and inboard sides, respectively, it is indeed advantageous in terms of cost.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
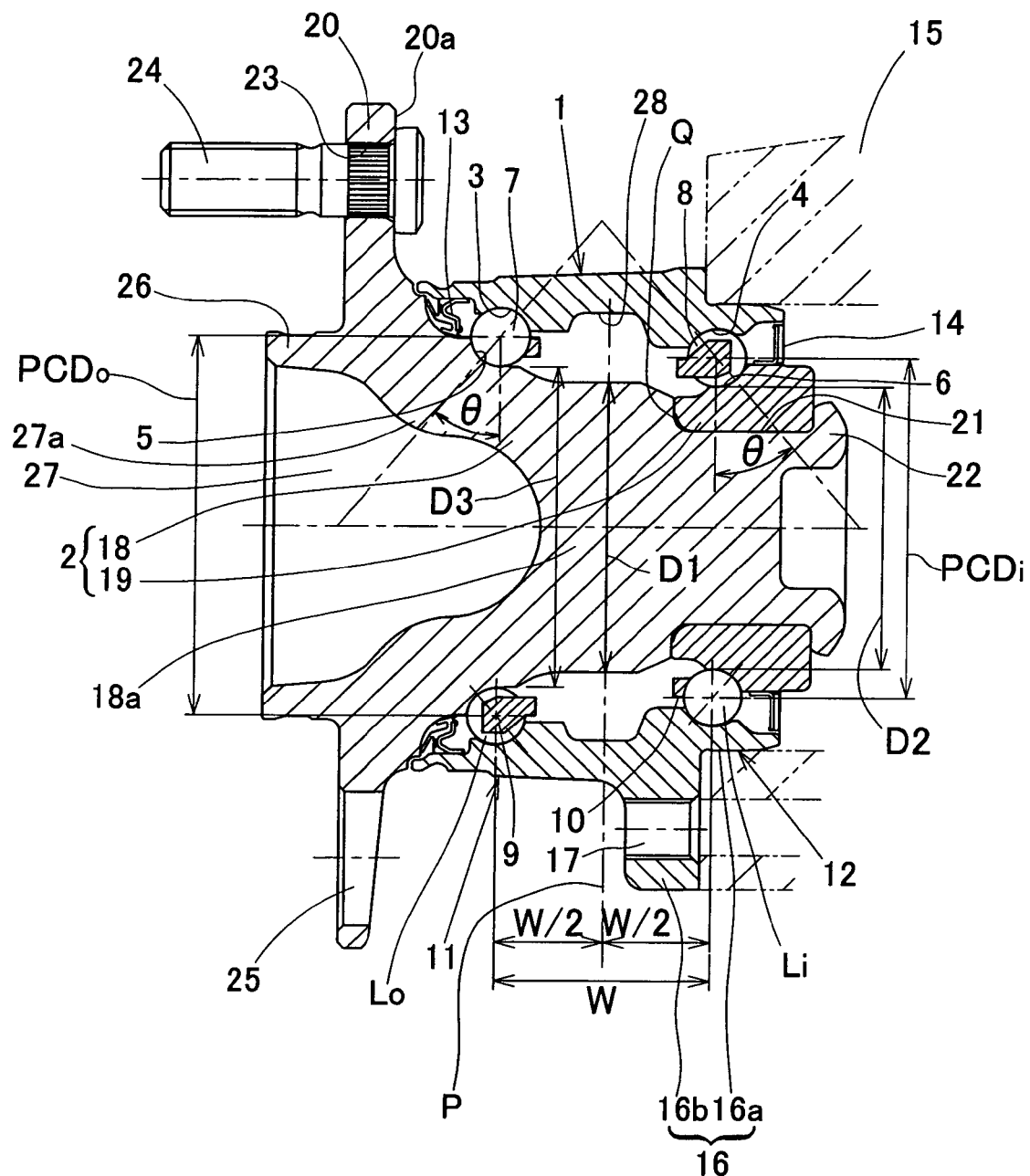
FIG. 1 is a longitudinal sectional view of a wheel support bearing assembly according to a first preferred embodiment of the present invention.

The wheel support bearing assembly according to a first preferred embodiment of the present invention will now be described with particular reference to FIGS. 1 to 3. This embodiment is applied to a third-generation wheel support bearing assembly of an inner race rotating type specifically designed to rotatably support an automotive driven wheel. In the description that follows, the term "inboard" is to be understood as descriptive of the position relative to a vehicle body structure that lies on one side of the vehicle body structure close towards the longitudinal center of the vehicle body structure and, similarly, the term "outboard" is to be understood as descriptive of the position relative to the vehicle body structure that lies on the opposite side of the vehicle structure away from the longitudinal center of the vehicle structure.

The illustrated wheel support bearing assembly includes an outer member 1 having an inner peripheral surface formed with a plurality of, for example, two, axially spaced outboard and inboard raceways 3 and 4 each in the form of a raceway groove, a generally tubular inner member 2 positioned inside the outer member 1, with an annular bearing space defined between it and the outer member 1, and having an outer peripheral surface formed with outboard and inboard raceways 5 and 6, each in the form of a raceway groove, in cooperative relation to and aligned with the outboard and inboard raceways 3 and 4 in the outer member 1, and dual rows Lo and Li of rolling elements 7 and 8 rollingly interposed between the raceways 3 and 5 and between the raceways 4 and 6, respectively.

The illustrated wheel support bearing assembly is regarded as a dual row angular contact ball bearing assembly and, thus, the rolling elements 7 and 8 are each in the form of a ball and are retained in a circular row by respective ball retainers 9 and 10. The raceways 3 to 6 in the outer and inner members 1 and 2 represents an arcuate sectional shape and are so arranged that the contact angles θ between the outboard row Lo of the rolling elements 7 and the inner and outer members 1 and 2 and between the inboard row Li of the rolling elements 8 and the inner and outer members 1 and 2, respectively, may be held in back-to-back relation with each other. In other words, the outboard and inboard rows Lo and Li of the rolling elements 7 and 8, spaced apart from each other in a direction axially of the bearing assembly, are each in the form of an angular contact ball bearing and are held in back-to-back relation with each other.

The annular bearing space delimited between the outer member 1 and the inner member 2 has an outboard open end sealed by a sealing member 13 and also has an inboard open end substantially tightly closed by an end cap (not shown) of a size sufficient to cover an inboard end of the bearing assembly. The inner member 2 has an inboard end on which a magnetic encoder 14 forming a part of a revolution sensor unit for detecting the number of revolutions of the inner member 2 relative to the outer member 1 is mounted.

The outer member 1 serves as a stationary or fixed member and is provided with a knuckle mount 16a for receiving a knuckle 15, forming a part of an automotive suspension system (not shown), and a vehicle body fitting flange 16b. The knuckle mount 16a and the vehicle body fitting flange 16b in the outer member collectively define a mounting area 16 through which the bearing assembly is fixedly coupled to the knuckle 15. Specifically, the knuckle mount 16a is formed on an inboard end of the outer member 1 and the vehicle body fitting flange 16b is defined in similarly on the inboard end of the outer member 1 so as to protrude radially outwardly in the neighborhood of the knuckle mount 16a. The vehicle body fitting flange 16b has a bolt insertion hole 17 in the form of an internally threaded hole defined partly at a plurality of locations circumferentially of the outer member 1 and, accordingly, when set bolts (not shown) are, after having been passed through the knuckle, threaded firmly into the respective bolt holes 17, the wheel support bearing assembly can be fixedly coupled to the knuckle 15. It is, however, to be noted that instead of the internally threaded bolt insertion holes 17, nuts may be employed for engagement with the set bolts (not shown).

The knuckle mount 16a is of a size smaller in outer diameter than that of the remaining portion of the outer member 1 and the inboard raceway 4 referred to above is defined in a portion of the inner peripheral surface of the outer member at the axial position of the knuckle mount 16a.

On the other hand, the inner member 2 serves as a rotatable member and is made up of a hub axle 18 and an inner race member 19, with the outboard and inboard raceways 5 and 6 defined in the hub axle 18 and the inner race member 19, respectively. The hub axle 18 includes an shaft member 18a having an outboard end formed with a wheel fitting hub flange 20 defined therein so as to extend radially outwardly and an inboard end radially inwardly depressed to define a reduced diameter portion that defines an inner race mount 21. The inner race member 19 is axially immovably and non-rotatably mounted on the inner race mount 21 defined in the hub axle 18 and is fixed thereto by means of a radially outwardly crimped portion 22. This crimped portion 22 is formed by radially outwardly crimping a cylindrical inboard extremity of the shaft member 18a of the hub axle 18 by the use of, for example, roll crimping technique.

The hub flange 20 referred to above has a bolt insertion hole 23 defined therein at a plurality of locations circumferentially thereof and includes bolts 24 press-fitted into those bolt insertion holes 23. A brake disc and an automotive driven wheel (both not shown) held in overlapped relation with the brake disc are rigidly secured to the hub flange 20 through the bolts 24 by means of respective nuts (not) fastened to those bolts 24 in a manner well known to those skilled in the art. This hub flange 20, although continuing over the entire circumferentially of the hub axle 18 while extending radially outwardly therefrom, has circumferentially spaced portions increased in thickness to define corresponding thick wall portions 20a, as best shown in FIG. 3, where the respective bolt insertion holes 23 are defined. Also, as best shown in FIG. 3, the remaining circumferential portions of the hub flange 20 each between the neighboring thick wall portions 20a have a reduced wall thickness and are hollowed at 25 for the purpose of reducing the weight of the hub axle 18 and, hence, that of the resultant bearing assembly.

An outboard extremity of the hub axle 18 on an outboard side of the hub flange 20 has an axial recess 27 defined therein so as to extend axially inwardly, leaving an cylindrical pilot wall 26 for guiding respective inner peripheral surfaces of the brake disc and wheel, when the latter are mounted onto the hub flange 20.

The outboard and inboard rows Lo and Li of the rolling elements (balls) 7 and 8 have the following dimensional relation. Specifically, the diameter of the pitch circle depicted by the balls 7 of the outboard row Lo, hereinafter referred to as the pitch circle diameter PCDo, is chosen to be greater than the pitch circle diameter PCDi depicted by the balls 8 of the inboard row Li. Although the balls 7 of the outboard row Lo have the same diameter as that of the balls 8 of the inboard row Li, the difference between the pitch circle diameter PCDo and the pitch circle diameter PCDi renders it possible to employ the number of the bolls 7 of the outboard row Lo that is greater than the number of the balls 8 of the inboard row Li. By way of example, in the illustrated embodiment, the number of the balls 7 of the outboard row Lo is 19 and the number of the balls 8 of the inboard row Li is 17. The contact angle θ in the outboard row Lo of the balls 7 is chosen to be the same as the contact angle θ in the inboard row Li and is, for example, 40°.

The shaft member 18a of the hub axle 18 is so shaped and so designed that the outer diameter D1 of the hub axle 18, specifically the shaft member 18a, as measured at a point P intermediate between the outboard and inboard rows Lo and Li of the rolling elements or balls 7 and 8 is greater than the minimum diameter D2 of the inner member 2, specifically the inner race member 19 on the shaft member 18a, as measured at the inboard raceway 6 defined in the inner race member 19 in the form of a raceway groove. The intermediate point P referred to above lies in alignment with a point intermediate of the span W between the rolling elements 7 of the outboard row Lo and the rolling elements 8 of the inboard row Li. The position Q, at which the inner race member 19 is held in abutment with one end of the inner race mount 21 of the hub axle 18 lies on an inboard side of the intermediate point P.

Figure 2:
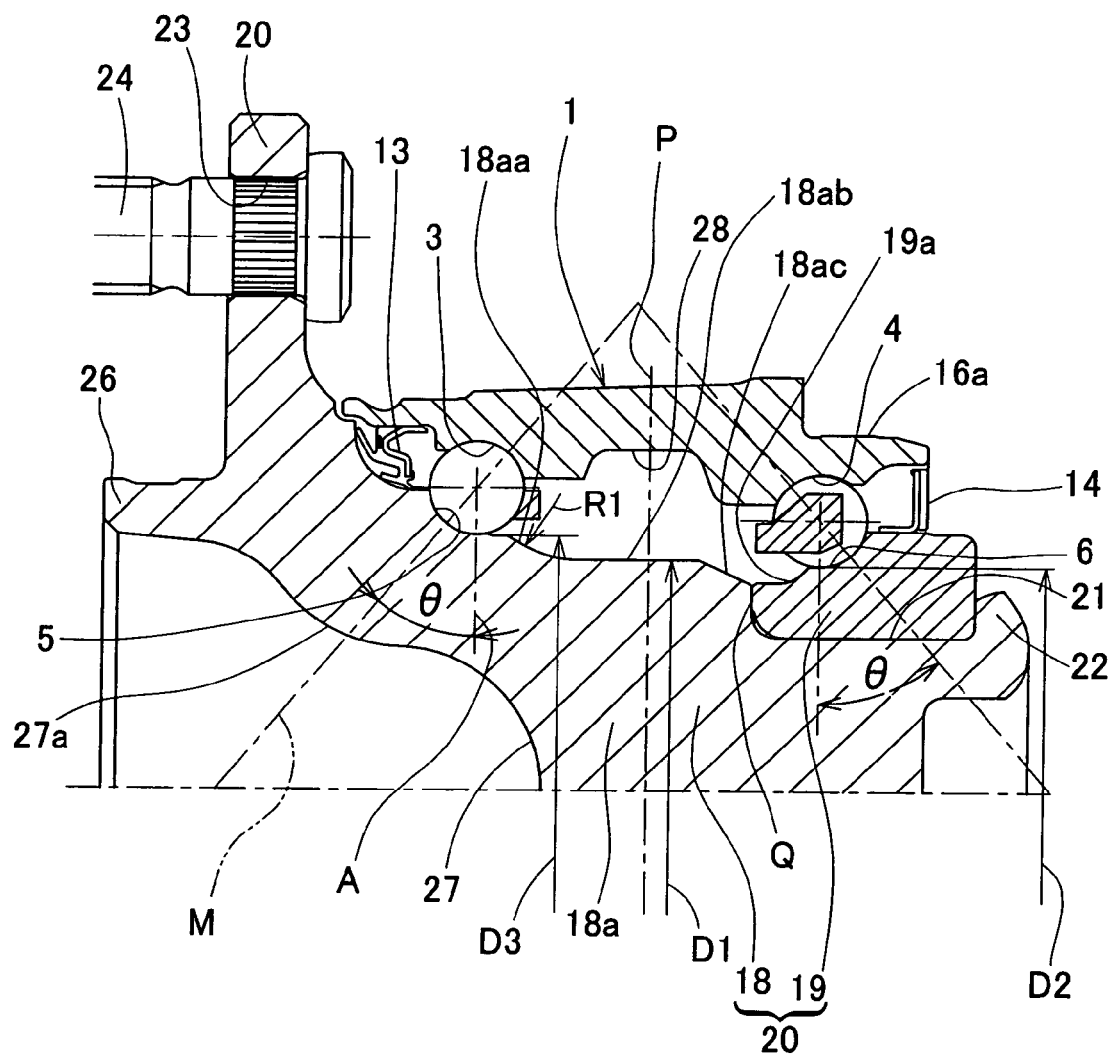
FIG. 2 is a fragmentary longitudinal sectional view showing a portion of the wheel support bearing assembly of FIG. 1 on an enlarged scale.
Figure 3:
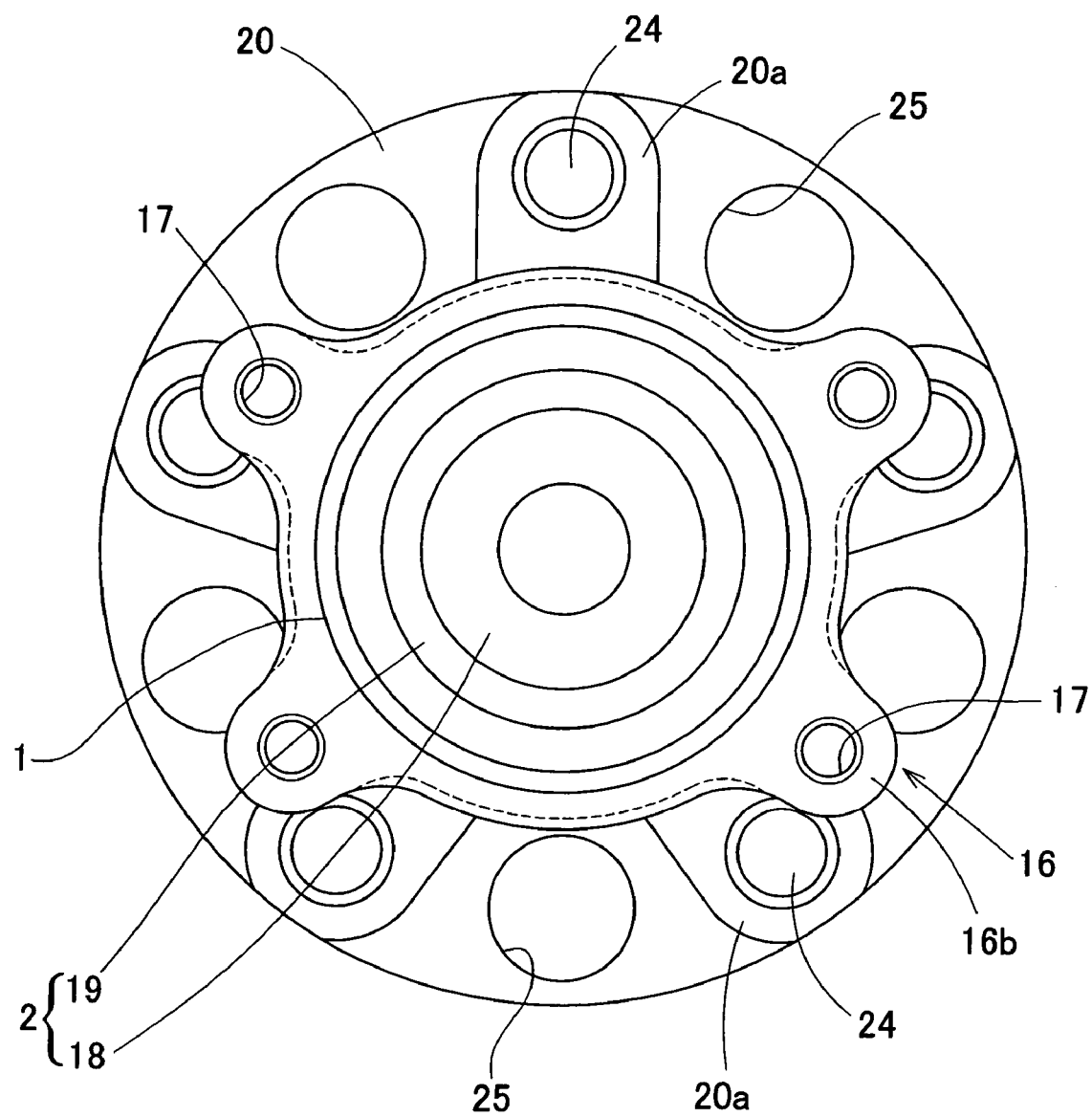
FIG. 3 is a side view of the wheel support bearing assembly of FIG. 1 as viewed from an inboard side.

As best shown in FIG. 2 on an enlarged scale, the region of the shaft member 18a of the hub axle 18 between the outboard row Lo of the rolling element 7 and the inboard row Li of the rolling elements 8 is so dimensioned as follows. Specifically, an area of the shaft member 18a, where the outboard raceway 5 is defined, has a minimum diameter D3 as measured in the vicinity of the geometric center of each rolling elements 7 and a portion of the shaft member 18a that defines the minimum diameter D3 extends towards the inboard side a certain distance about equal to a fraction of the diameter of each ball 7. The shaft member 18a of the hub axle 18 has an outer peripheral surface comprised of a first varying diameter portion 18aa of a substantially arcuate sectional shape defined on an onboard side of the raceway 5 and having an outer diameter decreasing towards the inboard side, a straight portion 18ab continued from the first varying diameter portion 18aa and having a constant outer diameter, and a second varying diameter portion 18ac of a tapered defined on one side of the straight portion 18ab remote from the first varying diameter portion 18aa and having an outer diameter decreasing towards the inner race mount 21. The outer diameter of the straight portion 18ab referred to above defines the outer diameter D1 of the shaft member 18a measured at the point P intermediate between the outboard and inboard rows Lo and Li of the rolling elements or balls 7 and 8 as discussed previously.

The first varying diameter portion 18aa representing the arcuate sectional shape as described above has a radius of curvature R1 that is greater than the radius of curvature of the outboard raceway 5 in the hub axle 18 and equal to, for example, about twice the radius of curvature of the outboard raceway 5. In terms of specific numerical values, if the radius of curvature of the outboard raceway 5 in the form of a raceway groove is 10 mm, the radius of curvature R1 of the first varying diameter portion 18aa may be chosen to be about 20 mm.

With respect to the inner race member 19, a portion thereof on an outboard side of the inboard raceway 6 in the inner race member 19 is so designed and so configured as to define a reduced diameter portion 19a of an outer diameter smaller than the minimum diameter D2 of the inboard raceway 6 in the form of a raceway groove and, on the other hand, the second varying diameter portion 18ac of the shaft member 18a adjacent the inner race mount 21 has its minimum diameter about equal to the outer diameter of the reduced diameter portion 19a of the inner race member 19. It is to be noted that the reduced diameter portion 19a may not necessarily be provided in the inner race member 19 and, even in that case, the outer diameter D1 of the straight portion 18ab in the hub axle 18 must be greater than the minimum diameter D2 of the inner race member 19.

It is also to be noted that the varying diameter portion 18aa in the hub axle 18 may have a tapered sectional shape or may have its outer diameter decreasing moderately.

The axial recess 27 defined in the hub axle 18 as hereinabove described has a depth enough to allow the axial recess 27 to extend towards the inboard side past the axial position A that lies in the imaginary plane containing the respective geometric centers of the rolling elements 7 of the outboard row Lo and lying perpendicular to the longitudinal axis of the bearing assembly. In the illustrated embodiment, the depth of this axial recess 27 is so chosen as to allow the axial recess 27 to have its bottom positioned in the vicinity of the minimum outer diameter region of the first varying diameter portion 18aa of the hub shaft member 18a or an outboard end of the straight portion 18ab of the hub shaft member 18a. This axial recess 27 has such a longitudinal sectional shape as to have its diameter progressively decreasing towards the bottom thereof, but has an inwardly bulged wall portion 27a defined at a location generally aligned with the imaginary line M, drawn to define the contact angle θ for the outboard row Lo of the rolling elements 7, so as to protrude inwardly of the axial recess 27.

The outer member 1 has a portion of the inner peripheral surface thereof radially inwardly depressed so as to define an annular thinned wall portion 28 at a location substantially intermediate between the outboard and inboard rows Lo and Li of the rolling elements 7 and 8. This thinned wall portion 28 has an axial width about equal to half the distance between the outboard and inboard rows Lo and Li of the rolling elements 7 and 8 and also has a depth about equal to the depth of the outboard raceway 3 in the form of the raceway groove.

According to the foregoing first embodiment of the present invention, the outer diameter D1 of the hub axle 18 as measured at the point P intermediate between the outboard and inboard rows Lo and Li of the rolling elements 7 and 8 is so chosen as to be greater than the minimum diameter D2 of the hub axle 18 as measured at the inboard raceway 6 and, therefore, the hub axle 18 can have an increased rigidity against the moment load induced on the bearing assembly during the run of the automotive vehicle. Although in the conventional bearing assembly of a similar kind, the outer diameter of the hub axle as measured at a location intermediate between the outboard and inboard rows of the rolling element is so chosen as to be equal to the minimum diameter of the inboard raceway groove, increase of the outer diameter D1 of the hub axle 18 such as achieved in the present invention contributes to increase of the rigidity. Increase in diameter and wall thickness in various parts of the bearing assembly leads to increase of the rigidity, but analytical results of FEM (analysis with an Finite Element Method) have shown that increase of the outer diameter of the hub axle 18 at a location intermediate between the outboard and inboard rows Lo and Li of the rolling elements 7 and 8 is effective to increase the rigidity against the above discussed moment load. Accordingly, when the outer diameter D1 referred to above is increased, the rigidity can advantageously be increased without incurring an increase of the weight even though the wall thickness of other portions of the bearing assembly is depleted.

For depleting the wall thickness, the annular thinned wall portion 28 is provided in the inner peripheral surface of the outer member 1 in the form of a radially inwardly extending annular groove at that location substantially intermediate between the outboard and inboard rows Lo and Li of the rolling elements 7 and 8 as hereinbefore described.

According to the analytical results, that portion of the inner peripheral surface of the outer member 1 between the outboard and inboard rows Lo and Li of the rolling elements 7 and 8 is where the bearing rigidity is not so much affected, and therefore, the provision of the thinned wall portion 28 in the inner peripheral surface of the outer member 1 in the manner described above would little result in reduction of the rigidity. Accordingly, selection of the greater outer diameter D1 of the hub axle 18 at a location intermediate between the outboard and inboard rows Lo and Li of the rolling elements 7 and 8 and concurrent provision of the thinned wall portion 28, such as hereinbefore described, have been found resulting in increase of the bearing rigidity on the outboard side of the bearing assembly without increasing of the weight thereof.

Also, according to the first embodiment of the present invention described above, since the pitch circle diameter PCDo in the outboard row Lo is chosen to be greater than the pitch circle diameter PCDi in the inboard row Li, the bearing rigidity on the outboard side can increase. Also, since the number of the rolling elements 7 of the outboard row Lo is chosen to be greater than that of the rolling elements 8 in the inboard row Li as described hereinabove, the bearing rigidity on the outboard side of the bearing assembly is further increased. As a result that the pitch circle diameter PCDo in the outboard row Lo of the rolling elements 7 has been chosen to be greater than the pitch circle diameter PCDi in the inboard row Li of the rolling elements 8 as described hereinbefore, the increased outer diameter D1 of the hub axle 18 at that point P intermediate between the outboard and inboard rows Lo and Li of the rolling elements 7 and 8 can easily be designed. In other words, even when that portion of the hub axle 18 between the outboard and inboard rows Lo and Li of the rolling elements 7 and 8 is increased to a diameter greater than the minimum diameter D2 of the hub axle 18 as measured at the inboard raceway 6, it can have a diameter smaller than the minimum diameter D3 of that area of the shaft member 18a, where the outboard raceway 5 is defined and, therefore, there is no possibility that incorporation of the rolling elements 7 of the outboard row Lo onto the raceway 5 in the hub axle 18 will not be hampered.

With respect to the shape of the outer peripheral surface of the hub axle member 18a, since a portion of the hub axle 18 adjacent the inboard side of the outboard raceway 5 is formed as the varying diameter portion 18aa having an outer diameter smaller than the minimum diameter D3 of the outboard raceway 5, allowing the hub axle 18 to have a reduced outer diameter, the weight of the hub axle 18 can advantageously be reduced. In such case, while if the outer diameter changes abruptly, reduction of the rigidity of the outboard side of the hub axle 18 will result in, formation of that portion of the hub axle 18 as the varying diameter portion 18aa of an arcuate sectional shape having its outer diameter progressively changing and concurrent selection of the radius of curvature R1 of the varying diameter portion 18aa that is greater than the radius of curvature of the outboard raceway 5 are effective to increase the rigidity of the outboard side of the hub axle 18 and, at the same time to avoid an undesirable increase of the weight.

In addition, the axial recess 27 defined therein so as to extend axially inwardly from the outboard end face of the hub axle 18 is so designed to have a depth enough to allow the axial recess 27 to extend towards the inboard side past the axial position A that lies in the imaginary plane containing the respective geometric centers of the rolling elements 7 of the outboard row Lo and, therefore, the amount of material used to form the hub axle 18 that is depleted can be increased to thereby reduce the weight of the hub axle 18. The use of the axial recess 27 brings about little influence on the rigidity of the hub axle 18 and, accordingly, when the outer diameter D1 of the hub axle 18 at that point P intermediate between the outboard and inboard rows Lo and Li of the rolling elements 7 and 8 is increased such as in this first embodiment, the rigidity can be secured even though the axial recess 27 has a substantial depth as hereinbefore described. In view of this, increase of the weight can be suppressed and, at the same time, the bearing rigidity of the outboard region of the bearing assembly can be increased. Since the shape of the axial recess 27 is so shaped that the radially inwardly bulged wall portion 27a can be formed at that location generally aligned with the imaginary line M drawn to define the contact angle θ for the outboard row Lo of the rolling elements 7, the required rigidity can be secured while the axial recess 27 is so designed as to have an inner diameter as large as possible along with reduction of the weight of the hub axle 18.

Figure 4:
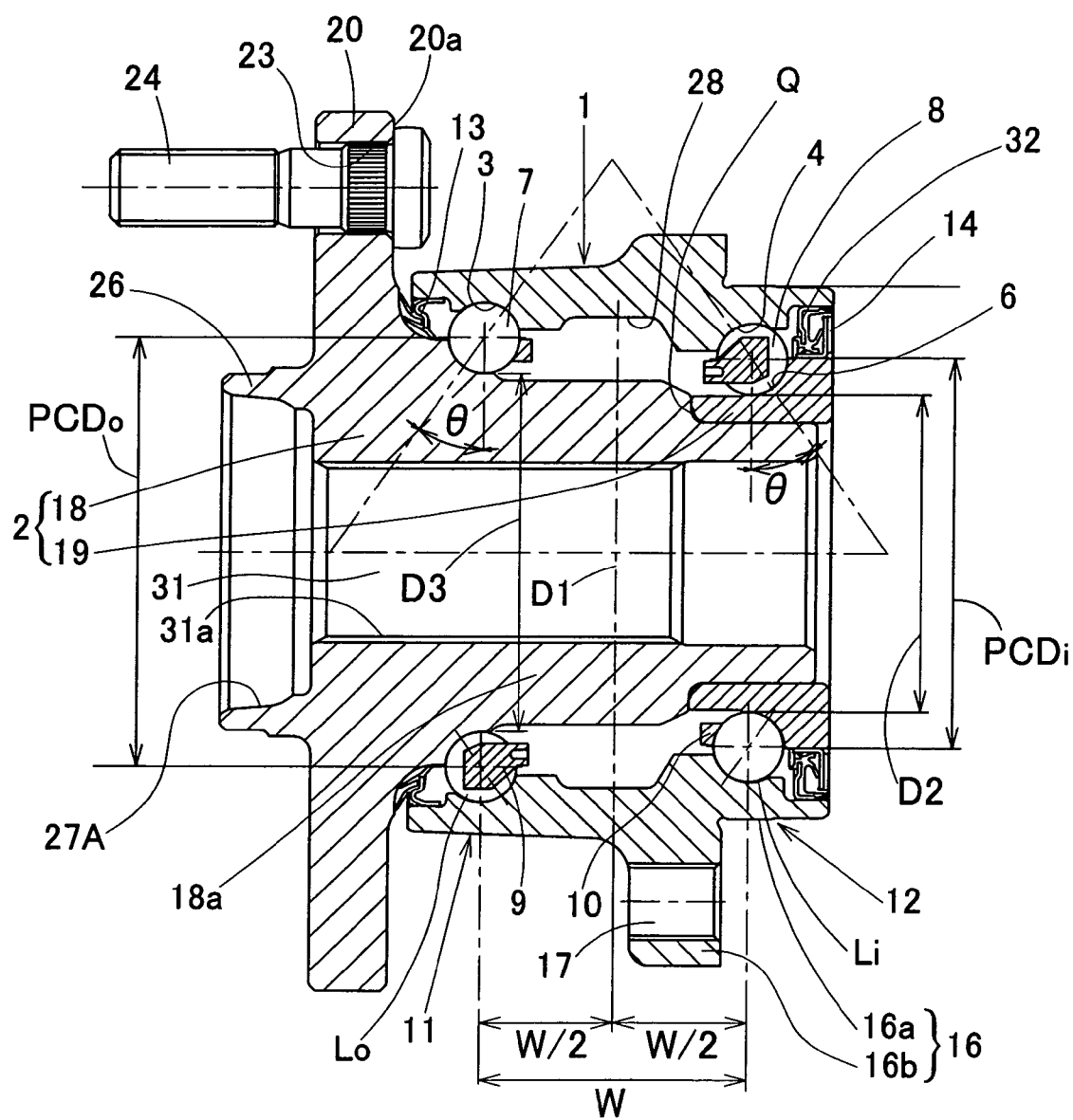
FIG. 4 is a longitudinal sectional view of a wheel support bearing assembly according to a second preferred embodiment of the present invention.

FIG. 4 illustrates a second preferred embodiment of the present invention. This second embodiment is applied to a third-generation wheel support bearing assembly of an inner race rotating type specifically designed to rotatably support an automotive drive wheel. This wheel support bearing assembly is generally similar to that shown in and described with reference to FIGS. 1 to 3 in connection with the foregoing first embodiment, but differs therefrom in that the hub axle 18 of the inner member 2 shown in FIG. 4 has an axially extending shaft coupling bore 31 defined therein for engagement with, for example, a stem portion of an outer race forming a part of a constant velocity joint (not shown). The stem portion of the outer race of the constant velocity joint is so splined at spline groove 31a to the hub axle 18 through the axial coupling bore 31 so that the inner member 2 can rotate together with the outer race of the constant velocity joint. As a result of use of the axial coupling bore 31 in the hub axle 18, the axial recess now identified 27A is provided as a counterbore provided with a nut (not shown) threadingly engageable with an externally threaded free end portion of the stem portion of the outer race of the constant velocity joint. Fixed coupling of the inner race member 19 to the hub axle 18 is carried out by fastening the nut in the counterbore to urge a portion of the outer race of the constant velocity joint firmly towards an end face of the inner race member 19. Also, the inboard open end of the bearing space delimited between the outer and inner members 1 and 2 is sealed by a sealing member 32 and the magnetic encoder 14 serves as a slinger of the sealing member 32.

Other structural features of the bearing assembly according to the second embodiment are similar to those employed in the bearing assembly according to the first embodiment and, therefore, the details thereof are not reiterated for the sake of brevity.

Even where the present invention is applied to the wheel support bearing assembly for the support of the drive wheel, various effects such as afforded by the previously described first embodiment, including the capability of increasing the rigidity of the outboard region of the bearing assembly while the increase of the weight of the bearing assembly is suppressed, can be obtained.

Figure 5:
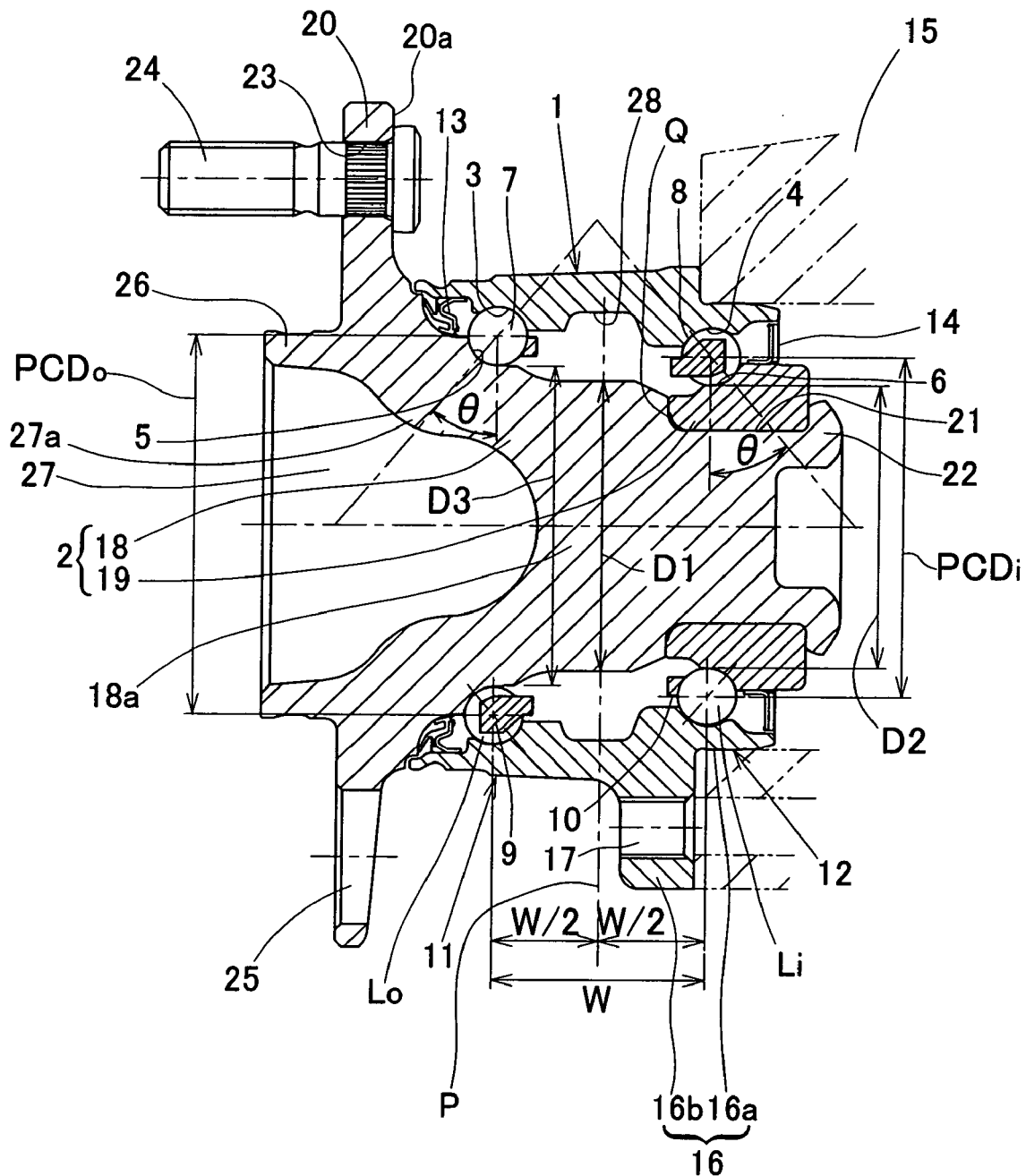
FIG. 5 is a longitudinal sectional view of a wheel support bearing assembly according to a third preferred embodiment of the present invention.
Figure 6:
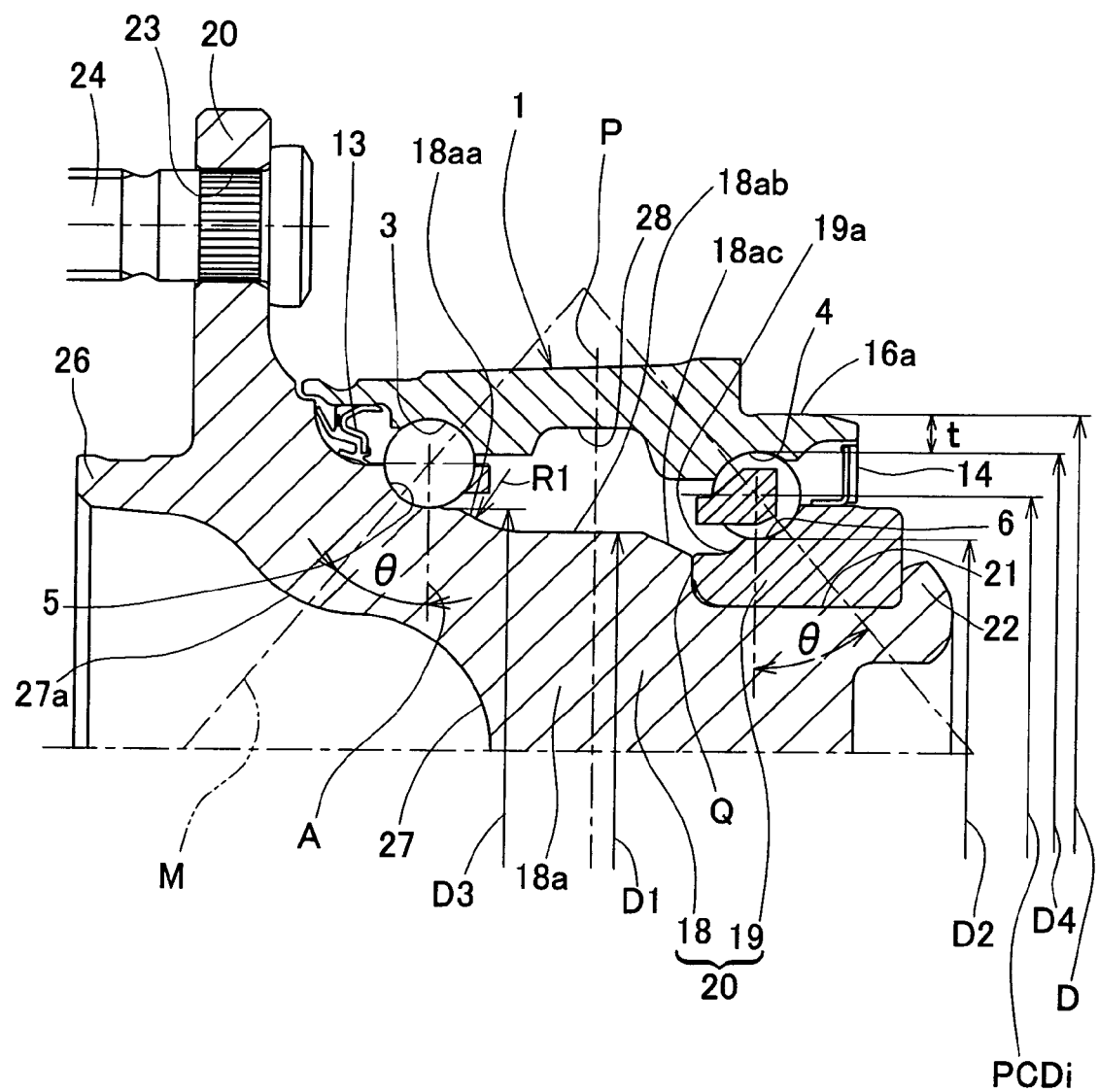
FIG. 6 is a fragmentary longitudinal sectional view showing a portion of the wheel support bearing assembly of FIG. 5 on an enlarged scale.

The third preferred embodiment of the present invention will now be described with particular reference to FIGS. 5 and 6. As is the case with the previously described first embodiment, this third embodiment is directed to the third-generation wheel support bearing assembly of an inner race rotating type specifically designed to rotatably support the driven wheel. This wheel support bearing assembly shown in FIGS. 5 and 6 is similar to that shown in and described with reference to FIGS. 1 to 3 in connection with the first embodiment, except for the knuckle mount 16a in the outer member 1 having an outer diameter expressed by D and the inboard row of the rolling elements (balls) 8 having the following dimensional relation:

$$0.14 \leq (d/PCDi) \leq 0.25$$

wherein d represents the diameter of each ball 8 of the inboard row Li and PCDi represents the pitch circle diameter depicted by the balls 8 of the inboard row Li.

Also, the ratio of the pitch circle diameter PCDi depicted by the balls 8 of the inboard row Li relative to the outer diameter D of the knuckle mount 16a in the outer member 1 is so chosen as to satisfy the following relationship:

$$0.66 \leq (PCDi/D) \leq 0.80$$

In addition, with respect to the inboard row Li of the rolling elements 8, the inner diameter D4 of the inboard raceway 4 in the outer member 1 is chosen to be of a maximum value available to the extent that a required wall thickness t can be obtained between the knuckle mount 16a and the inboard raceway 4 and the balls 8 of the inboard row Li are of a minimum diameter available to the extent that a predetermined rolling fatigue life can be obtained. The minimum required wall thickness t is, for example, about 4 mm regardless of the outer diameter D of the knuckle mount 16a and this is applicable to any wheel support bearing assembly employed in standard compact to large passenger cars.

In this outer member 1, the outboard and inboard raceways 3 and 4 for the outboard and inboard rows Lo and Li of the rolling elements 7 and 8, respectively, and the knuckle mount 16a are heat treated, i.e., hardened and, in view of the requirement in the heat treatment, the wall thickness t is fixed to the minimum available thickness.

According to the third embodiment described above, since the pitch circle diameter PCDo in the outboard row Lo of the rolling elements 7 is chosen to be greater than the pitch circle diameter PCDi in the inboard row Li of the rolling elements 8, the bearing rigidity of the outboard region of the bearing assembly can be increased. Also, since the number of the rolling elements 7 of the outboard row Lo is chosen to be greater than that of the rolling elements 8 of the inboard row Li, the bearing rigidity of the outboard region of the bearing assembly can be further increased.

As hereinbefore described, the rigidity of the inboard region of the bearing assembly can be increased and the rolling fatigue life can be secured, because while the rigidity of the outboard region of the bearing assembly has been increased and the ratio of the ball diameter d relative to the pitch circle diameter PCDi in the inboard row Li of the rolling elements 8, that is, d/PCDi, is so chosen as to satisfy the following formula:

$$0.14 \leq (d/PCDi) \leq 0.25$$

In other words, if for a given pitch circle diameter PCDi, the ball diameter d is reduced to allow the number of the balls used to increase, points of supports increase, accompanied by increase of the bearing rigidity. In terms of the increase of the rigidity, the balls preferably have as small a diameter as possible. However, with decrease of the ball diameter, the rolling fatigue life decreases. As a result of the FEM analysis (analysis with an Finite Element Method), it has been found that if the ratio d/PCDi is greater than 0.25, the rigidity required in the wheel support bearing cannot be increased, and if the ratio d/PCDi is smaller than 0.14, the rolling fatigue life required in the wheel support bearing assembly is insufficient.

Selection of the ratio d/PCDi within the range of 0.14 and 0.25, that is, $0.14 \leq (d/PCDi) \leq 0.25$, is effective to increase the rigidity and also to secure the rolling fatigue life. It is, however, to be noted that the ratio d/PCDi referred to above is preferably within the range of 0.15 and 0.20, that is, $0.15 \leq (d/PCDi) \leq 0.20$.

Figure 7:
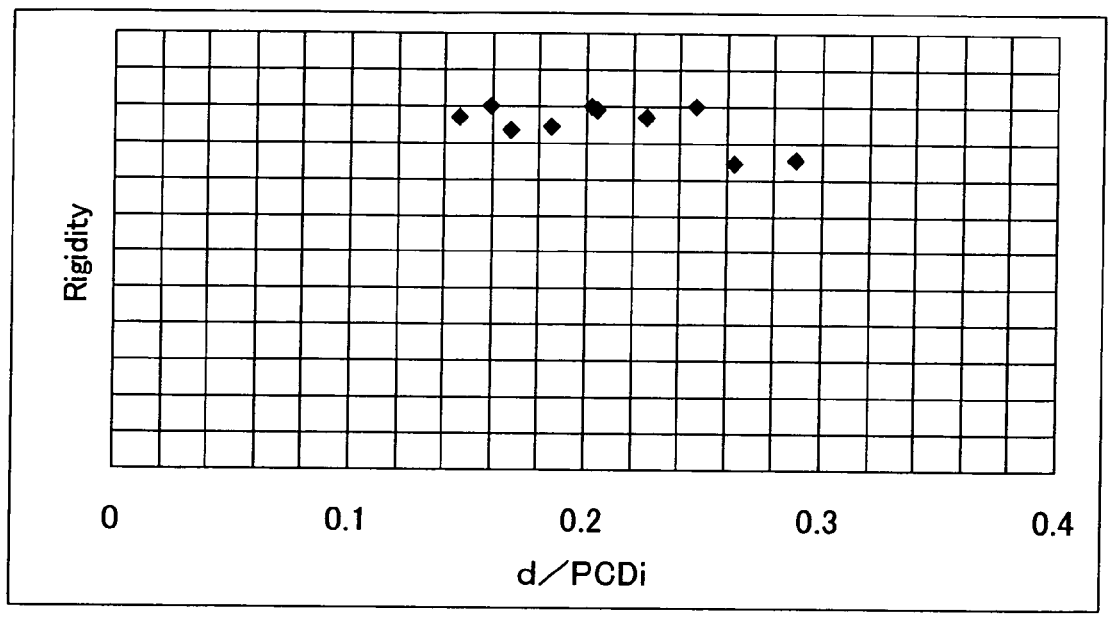
FIG. 7 is a chart showing results of tests conducted to determine the relationship between the rigidity and the ratio (d/PCDi) of the diameter of balls d relative to the pitch circle diameter PCDi.

Having examined the relation between the ratio d/PCDi and the rigidity in the inboard region of the bearing assembly, such results as shown in FIG. 7 were obtained. It is to be noted that the rigidity referred to above is derived from the basic static load rating described in the Japanese Industrial Standards (JIS) B1519.

Referring now to FIG. 7, the rigidity is substantially constant when the ratio d/PCDi is within the range of 0.14 to 0.25, but when the ratio d/PCDi exceeds 0.25, the rigidity abruptly decreases and, even when the ratio d/PCDi further increases, the rigidity remains at the lowered value. Accordingly, it is clear that if the ratio d/PCDi is greater than 0.25, no increase of the rigidity can be expected. On the other hand, if the ratio d/PCDi is smaller than 0.14, no problem arises as to the rigidity, but the rolling fatigue life cannot be secured as described above and, accordingly, the ratio d/PCDi that is smaller than 0.14 is undesirable.

It is also to be noted that depending on the size of the bearing assembly, it may occur that the rigidity will not increase even though the ratio d/PCDi is within the above described range, but in that case the rigidity can be increased if the size of the bearing assembly is properly selected when the ratio d/PCDi is within the above described range.

While in the conventional wheel support bearing assembly, the ball diameter is large relative to the pitch circle diameter PCDi and, therefore, it is designed to have a sufficient rolling fatigue life, but the rigidity is insufficient. However, the third embodiment of the present invention described hereinabove is intended to eliminate such a problem inherent in the conventional wheel support bearing assembly and, hence, to optimize the relationship between the rigidity and the rolling fatigue life.

Since in the outboard region, the balls of the same ball diameter d as that in the inboard region and the greater pitch circle diameter PCD are employed, the ratio d/PCD in the outboard region is smaller than that in the inboard region. However, the outboard region has a latitude in a quantity corresponding to the increased pitch circle diameter PCD and makes use of the balls of the same diameter as that in the inboard region and, therefore, the sufficient rolling fatigue life can be secured. If the balls in the outboard region has the same ball diameter as that in the inboard region, the balls of the same standard can be employed and, as compared with the use of the balls of the different diameters, advantages can be obtained in productivity and cost.

Also, in the third embodiment, increase of the rigidity in the inboard region and the rolling fatigue life can be secured since the ratio PCDi/D of the pitch circle diameter PCDi in the inboard row Li of the balls relative to the diameter D of the knuckle mount 16a in the outer member 1 is so chosen as to satisfy the following relationship:

$$0.66 \leq (PCDi/D) \leq 0.80$$

In other words, the outer diameter of the knuckle mount 16a in the outer member 1 is fixed to a specific value as the dimension required in the bearing design. For this reason, for this fixed outer diameter D of the knuckle mount 16a, it is necessary to increase the rigidity and to secure the rolling fatigue life.

The pitch circle diameter PCDi referred to above is a value equal to the difference between the inner diameter D4 of the raceway 4 in the inboard region less the ball diameter d and, therefore, the smaller the ball diameter d, the more close the centers of the balls to the inner peripheral surfaces of the raceway 4 and, hence, the more close the value of the pitch circle diameter PCDi to the value of the inner diameter D4 of the raceway 4. Since the inboard raceway 4 lies on the inner periphery of the knuckle 16a, the inner diameter D4 of the inboard raceway 4 is of a constant value expressed by D4=D−2×t, if the outer diameter D of the knuckle mount 16a is fixed and the wall thickness t of the outer periphery of the raceway groove in the outer member 1 is of a large value available to the extent it does not exceed the minimum required wall thickness. The minimum required thickness of the wall thickness t is, for example, about 4 mm as hereinbefore described.

If the inner diameter D4 of the inboard raceway is fixed, the pitch circle diameter PCDi (=D4−d) depends on the ball diameter d. If the outer diameter of the knuckle mount 16a is also fixed, the ratio PCDi/D depends on the ball diameter d and, hence, the smaller the balls, the greater the ratio PCDi/D.

If the ball diameter d is reduced, the number of the balls can be increased, resulting in increase of the support points, and therefore the bearing rigidity increases. For this reason, in terms of the increase of the rigidity, the ball diameter of a relatively small value is preferred.

Assuming that the outer diameter D of the knuckle mount is fixed and the required wall thickness t of the outer periphery of the raceway is also fixed, that is, the inner diameter D4 of the raceway is fixed, the relation between the rolling fatigue life and the rigidity was determined relying on the FEM analysis. As a result thereof, it has been found that if the ratio PCDi/D is not greater than 0.66, the rigidity in the wheel support bearing assembly does not increase and, on the other hand, if the ratio PCDi/D is not smaller than 0.80, the rolling fatigue life of the wheel support bearing assembly is insufficient. Accordingly, if the ratio PCDi/D is selected to be within the range of 0.66 to 0.80, preferably within the range of 0.67 and 0.76, the rolling fatigue life can be secured and, at the same time, the rigidity can also be increased.

Figure 8:
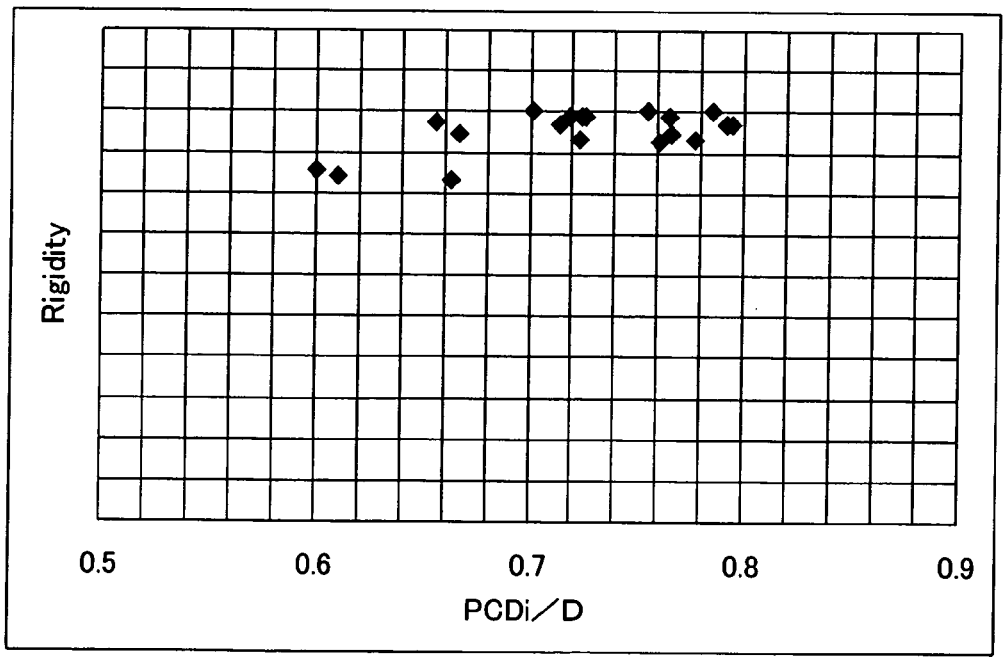
FIG. 8 is a chart showing the relation between the rigidity and the ratio (PCDi/D) of the pitch circle diameter PCDi relative to the outer diameter D of a knuckle engagement portion.

Having examined the relation between the ratio PCDi/D and the rigidity in the inboard region of the bearing assembly, such results as shown in FIG. 8 were obtained.

Referring to FIG. 8, the rigidity is substantially constant when the ratio PCDi/D is within the range of 0.66 and 0.80, but when the ratio PCDi/D attains a value smaller than 0.66, the rigidity abruptly decreases and, even when the ratio PCDi/D further decreases, the rigidity remains at the lowered value. Accordingly, it is clear that if the ratio PCDi/D attains a value smaller than 0.66, no increase of the rigidity can be expected. On the other hand, if the ratio PCDi/D exceeds 0.80, no problem arises as to the rigidity, but the rolling fatigue cannot be secured as described above and, accordingly the ratio PCDi/D that is greater than 0.80 is undesirable.

It is also to be noted that depending on the size of the bearing assembly, it may occur that the rigidity will not increase even though the ratio PCDi/D is within the above described range, but in that case the rigidity can be increased if the size of the bearing assembly is properly selected when the ratio PCDi/D is within the above described range.

While in the conventional wheel support bearing assembly, the ball diameter is large relative to the outer diameter D of the knuckle mount and, therefore, it is designed to have a sufficient rolling fatigue life, but the rigidity is insufficient. However, the third embodiment of the present invention described hereinabove is intended to eliminate such a problem inherent in the conventional wheel support bearing assembly and, hence, to optimize the relationship between the rigidity and the rolling fatigue life.

Figure 9:
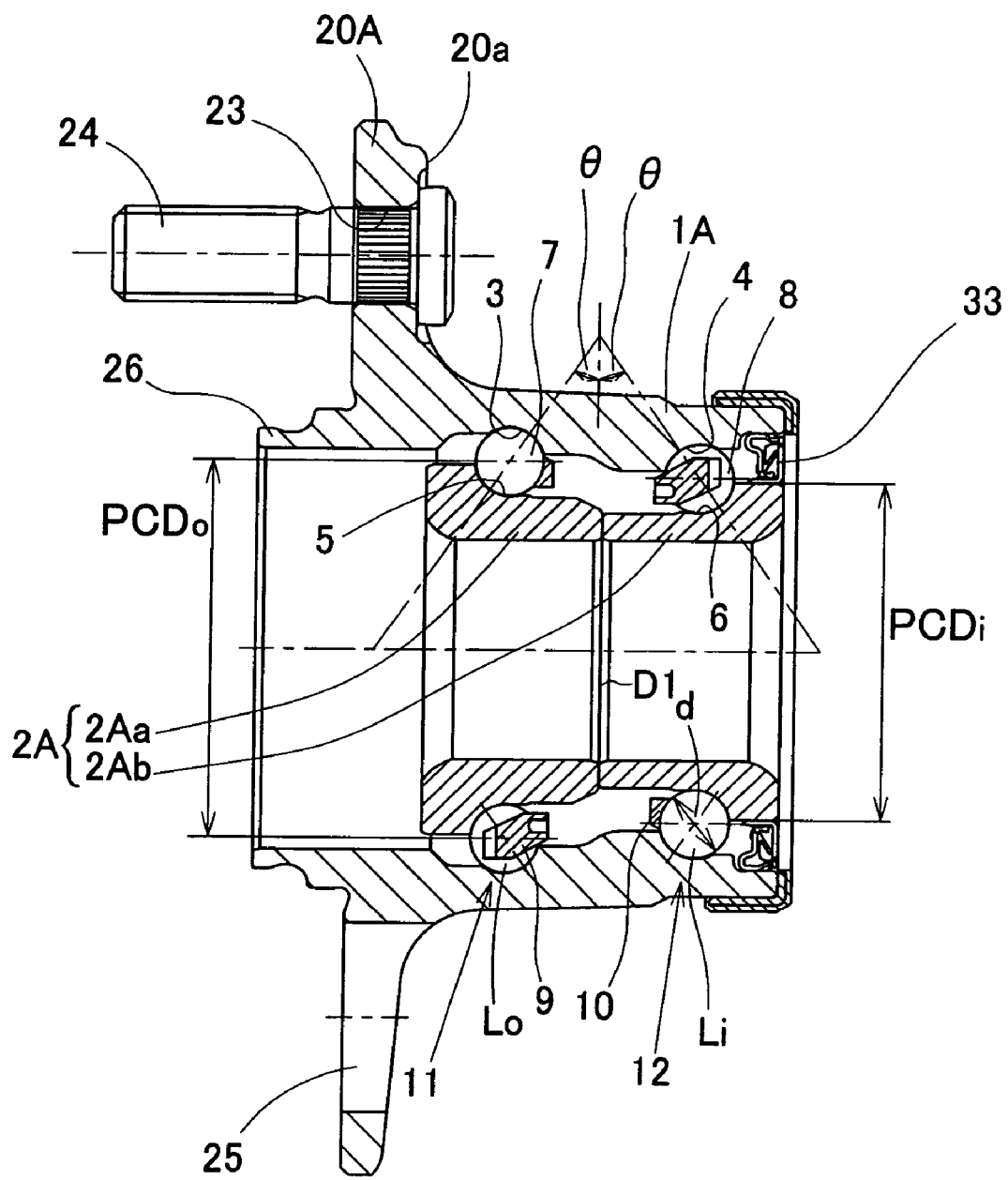
FIG. 9 is a longitudinal sectional view of a wheel support bearing assembly according to a fourth preferred embodiment of the present invention.

FIG. 9 illustrates a fourth preferred embodiment of the present invention. This fourth embodiment is directed to a second-generation wheel support bearing assembly of an outer race rotating type for rotatably supporting a driven wheel. This wheel support bearing assembly includes an outer member 1A having an inner peripheral surface formed with outboard and inboard raceways 3 and 4 and having an outboard end formed with a wheel mounting flange 20A that extends radially outwardly therefrom. The wheel support bearing assembly also includes an inner member 2A serving as a stationary or fixed member and made up of axially juxtaposed, outboard and inboard race members 2Aa and 2Ab having their respective outer peripheral surface formed with outboard and inboard raceways 5 and 6, respectively. Outboard and inboard rows of balls 7 and 8 are interposed between the outboard and inboard raceways 3 and 4 in the outer member and the inboard raceways 5 and 6 in the race members 2Aa and 2Ab. The inner member 2A has an axially extending bore defined therein, into which a stationary or fixed axle is fixedly engaged.

The wheel support bearing assembly shown in FIG. 9 is in the form of a dual row angular contact ball bearing with the outboard and inboard rows of the balls 7 and 8 being rollingly retained by respective ball retainers 9 and 10. Each of the raceways 3 to 6 referred to above has an arcuate sectional shape and those raceways 3 to 6 are so arranged that the contact angles θ between the outboard row of the rolling elements 7 and the inner and outer members 1A and 2A and between the inboard row of the rolling elements 8 and the inner and outer members 1A and 2A, respectively, may be held in back-to-back relation with each other. In other words, bearing portions 11 and 12 of the outboard and inboard rows Lo and Li of the rolling elements 7 and 8, spaced apart from each other in a direction axially of the bearing assembly, are each in the form of an angular contact ball bearing and are held in back-to-back relation with each other. The annular bearing space between the outer and inner members 1A and 2A has an inboard open end sealed by a sealing member 33.

The flange 20A referred to above has a bolt insertion holes 23 defined therein at a plurality of locations circumferentially thereof and includes bolts 24 press-fitted into those bolt insertion holes 23. A brake disc and an automotive driven wheel (both not shown) held in overlapped relation with the brake disc are rigidly secured to the flange 20A through the bolts 24 by means of respective nuts (not shown) fastened to those bolts 24 in a manner well known to those skilled in the art. This flange 20A, although continuing over the entire circumferentially of the outer member 1A while extending radially outwardly therefrom, has circumferentially spaced portions increased in thickness to define corresponding thick wall portions 20a, where the respective bolt insertion holes 23 are defined. Also, the remaining circumferential portions of the flange 20A each between the neighboring thick wall portions 20a have a reduced wall thickness and are hollowed at 25 for the purpose of reducing the weight of the resultant bearing assembly.

An outboard extremity of the outer member 1A on an outboard side of the flange 20A is formed with an cylindrical pilot wall 26 so as to protrude therefrom towards the outboard side and operable to guide respective inner peripheral surfaces of the brake disc and wheel, when the latter are mounted onto the flange 20A.

The outboard and inboard rows Lo and Li of the balls 7 and 8 have the following dimensional relation. Specifically, the pitch circle diameter PCDo of the outboard row Lo of the balls 7 is chosen to be greater than the pitch circle diameter PCDi of the inboard row Li of the balls 8. Although the balls 7 of the outboard row Lo have the same diameter as that of the balls 8 of the inboard row Li, the difference between the pitch circle diameter PCDo and the pitch circle diameter PCDi renders it possible to employ the number of the bolls 7 of the outboard row Lo that is greater than the number of the balls 8 of the inboard row Li. By way of example, in the illustrated embodiment, the number of the balls 7 of the outboard row Lo is 19 and the number of the balls 8 of the inboard row Li is 17. The contact angle θ in the outboard row Lo of the balls 7 is chosen to be the same as the contact angle θ in the inboard row Li and is, for example, 40°.

Describing the dimensions of the inboard row Li of the balls 8, the ratio d/PCDi of the ball diameter d in the inboard row Li relative to the pitch circle diameter PCDi of the inboard row Li of the balls 8 is so chosen as to satisfy the following formula:

$$0.14 \leq (d/PCDi) \leq 0.25$$

1048 Even with the wheel support bearing assembly according to the fourth embodiment, since the pitch circle diameter PCDo of the outboard row Lo of the balls 7 is chosen to be greater than the pitch circle diameter PCDi of the inboard row Li of the balls 8, the bearing rigidity in the outboard region thereof can increase. Also with respect to the numbers of the balls 7 and 8, the number of the balls 7 of the outboard row Lo is chosen to be greater than that of the balls 8 of the inboard row Li, the bearing rigidity of the outboard region of the bearing assembly can increase further.

Because while the rigidity of the outboard region of the bearing assembly has been increased and the ratio d/PCDi of the ball diameter d relative to the pitch circle diameter PCDi in the inboard row Li of the rolling elements 8 is so chosen as to satisfy the following formula, $0.14 \leq (d/PCDi) \leq 0.25$, as described above, the rigidity of the inboard region of the bearing assembly can be increased and the rolling fatigue life can be secured in a manner similar to that according to any one of the first to third embodiments.

Figure 10:
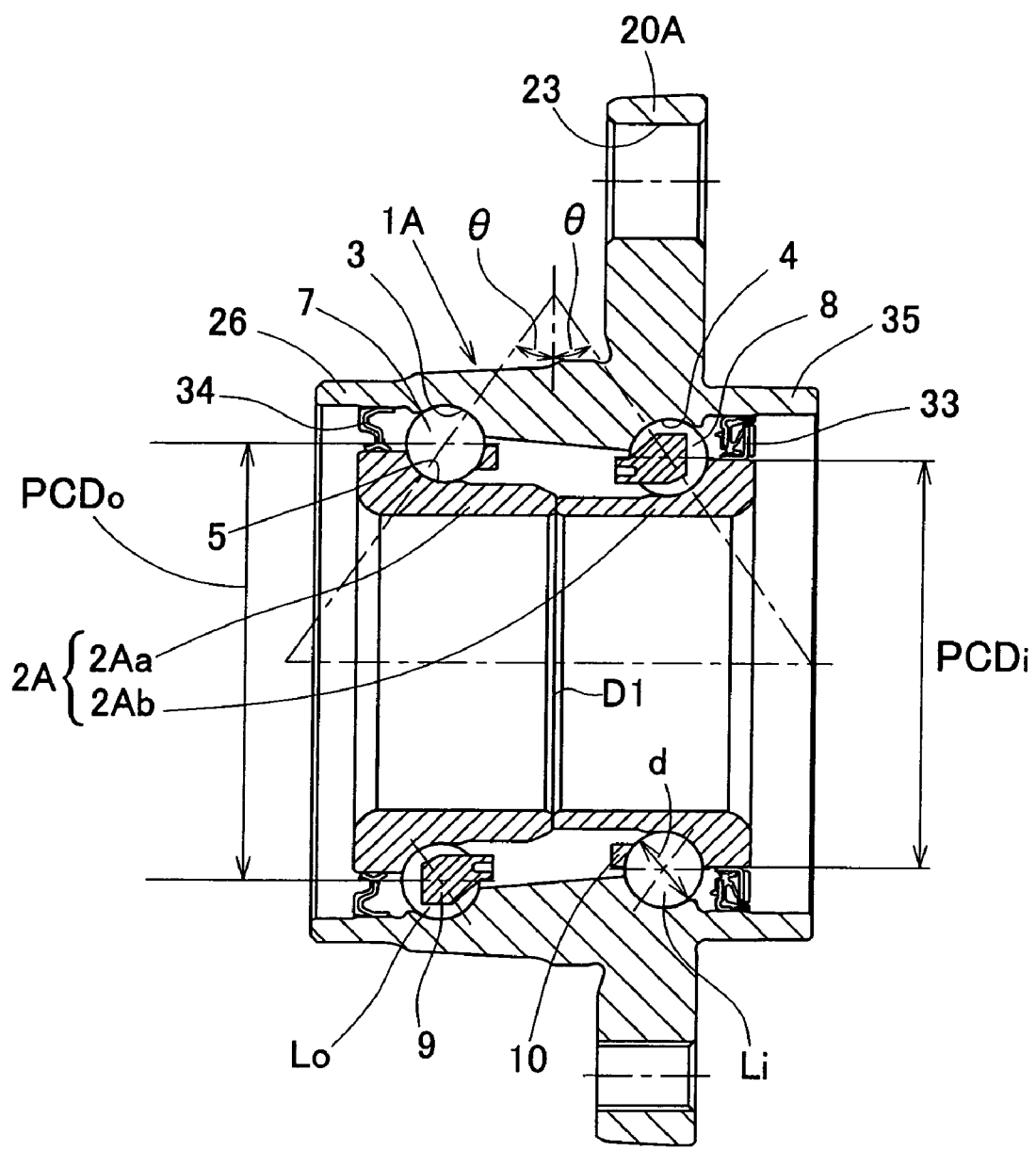
FIG. 10 is a longitudinal sectional view of a wheel support bearing assembly according to a fifth preferred embodiment of the present invention.
Figure 11:
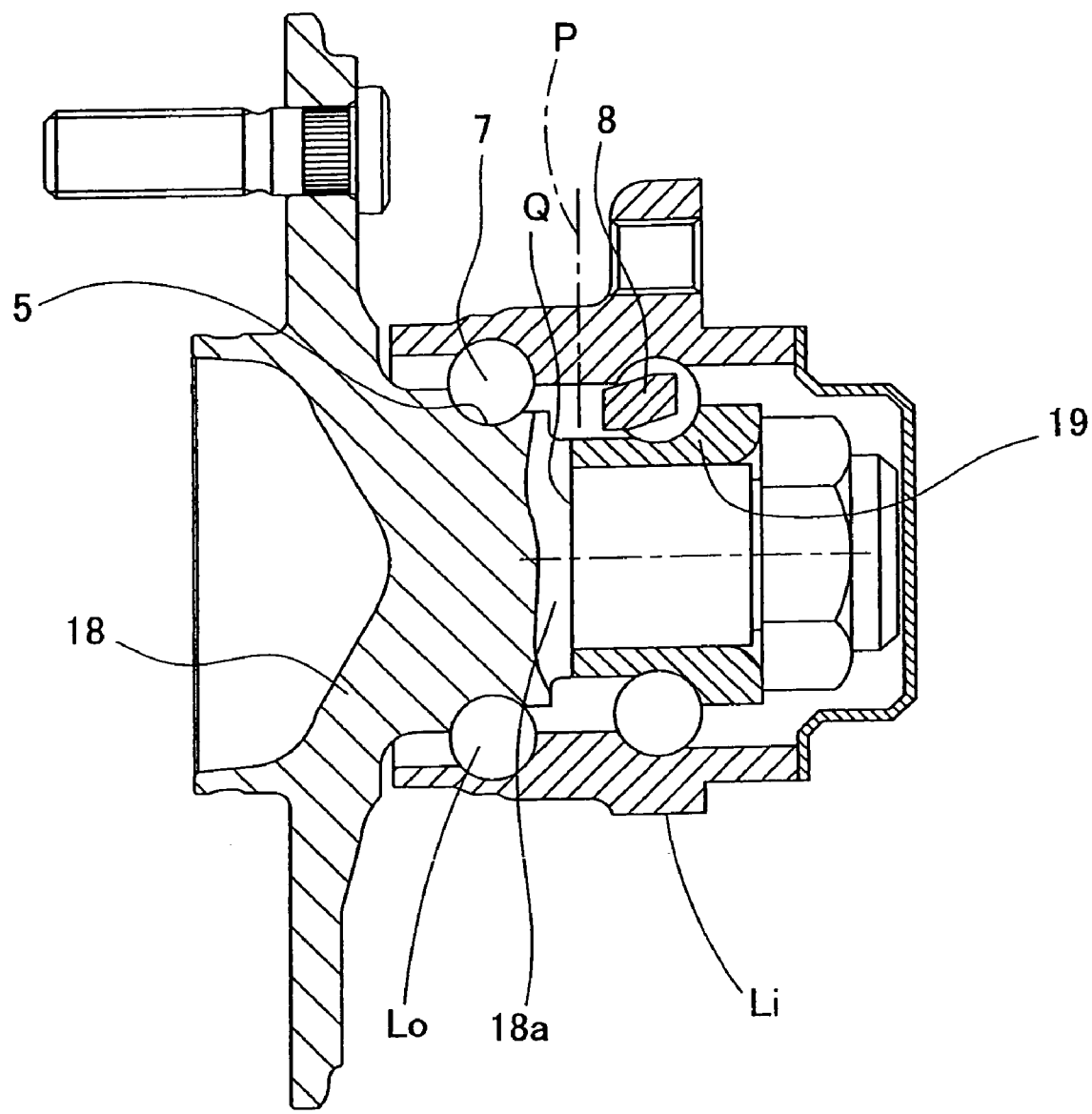
FIG. 11 is a longitudinal sectional view showing the conventional wheel support bearing assembly.

FIG. 10 illustrates a fifth preferred embodiment of the present invention. The wheel support bearing assembly according to this fifth embodiment is a second generation bearing assembly of an outer race rotating type and used for rotatably supporting a drive wheel. This wheel support bearing assembly shown in FIG. 10 is similar to the wheel support bearing assembly used to support the driven wheel as shown in and described with reference to FIG. 9, but differs therefrom in that as shown in FIG. 10, the position of the wheel fitting flange 20A of the outer member 1A is shifted towards the inboard side from the intermediate point between the outboard and inboard rows Lo and Li of the rolling elements 7 and 8 and a portion of the outer peripheral surface of the outer member 1A on the inboard side with respect to the wheel fitting flange 20A is formed as an axially extending drive axle coupling surface 35 for connection with a drive axle. The annular bearing space delimited between the outer and inner members 1A and 2 have its opposite annular open ends sealed by respective sealing members 33 and 34.

Other structural features of the wheel support bearing assembly according to the fifth embodiments are similar to those of the wheel support bearing assembly according to the fourth embodiment shown in and described with reference to FIG. 9 and, therefore, the details thereof are not reiterated for the sake of brevity.

Even in this fifth embodiment, since the pitch circle diameter PCDo of the outboard row Lo of the balls 7 is chosen to be greater than the pitch circle diameter PCDi of the inboard row Li of the balls 8, the bearing rigidity in the outboard region thereof can increase. Also with respect to the numbers of the balls 7 and 8, the number of the balls 7 of the outboard row Lo is chosen to be greater than that of the balls 8 of the inboard row Li, the bearing rigidity of the outboard region of the bearing assembly can increase further.

Also, because while the rigidity of the outboard region of the bearing assembly has been increased and the ratio d/PCDi of the ball diameter d relative to the pitch circle diameter PCDi in the inboard row Li of the rolling elements 8 is so chosen as to satisfy the following formula, $0.14 \leq (d/PCDi) \leq 0.25$, as described above, the rigidity of the inboard region of the bearing assembly can be increased and the rolling fatigue life can be secured in a manner similar to that according to any one of the first to third embodiments.

Although any one of the foregoing embodiments has been shown and described as having such a limitation that the outer diameter D1 of the hub axle as measured at the point intermediate between the outboard and inboard rows Lo and Li of the rolling elements 7 and 8 is greater than the minimum diameter of the inboard raceway, the present invention is to be understood as encompassing the following modes (1) to (7) of embodiment, which do not include such limitation.

Mode (1):

A wheel support bearing assembly including an outer member having an inner periphery formed with a plurality of raceways, an inner member having an outer periphery formed with raceways cooperable and aligned with the raceways in the outer member, rows of balls interposed between the raceways in the outer member and the raceway in the inner member, respectively, and a wheel fitting flange provided in the outer periphery of one of the outer and inner members, wherein the diameter of the pitch circle depicted by the balls of a row on an outboard side is greater than that depicted by the balls of a row on an inboard side, the balls of the row on the outboard side has the same diameter as that of the balls of the row on the inboard side, and the number of the balls in the row on the outboard side is greater than that of the balls in the row on the inboard side, and wherein the ratio (d/PCDi) of the diameter d of the balls relative to the pitch circle diameter PCDi in the row of the balls on the inboard side is chosen to be within the range of 0.14 to 0.25.

Mode (2):

In the wheel support bearing assembly as defined in Mode (1) above, the wheel fitting flange is provided in a portion of the outer periphery of an outboard end of one of the outer and inner members on the outboard side.

Mode (3):

In the wheel support bearing assembly as defined in Mode (2) above, the inner member has the wheel fitting flange, the outer member has a knuckle mount defined on the inboard end for engagement with a knuckle of a suspension system, and the raceway in the outer member on the inboard side is in its entirety or partly held in overlapping relation with an axial range in which the knuckle mount is defined.

Mode (4):

In the wheel support bearing assembly as defined in Mode (3) above, the inner member includes a hub axle having an outboard end provided with the wheel fitting hub flange and an inboard end provided with an inner race mount that is radially inwardly stepped to provide a reduced diameter, and an inner race member mounted on the inner race mount.

Mode (5):

A wheel support bearing assembly including an outer member having an inboard end formed with a knuckle mount defined in an outer periphery thereof for engagement with a knuckle of an automotive suspension system and also having an inner periphery formed with a plurality of raceways, in which the raceway in the outer member on the inboard side is in its entirety or partly held in overlapping relation with an axial range in which the knuckle mount is defined, and an inner member having an outer periphery formed with raceways cooperable and aligned with the raceways in the outer member and also having a wheel fitting flange provided in an outboard end of the outer periphery thereof, and rows of balls interposed between the raceways in the outer member and the raceway in the inner member, respectively, wherein the diameter of the pitch circle depicted by the balls of a row on an outboard side is greater than that depicted by the balls of a row on an inboard side, the balls of the row on the outboard side has the same diameter as that of the balls of the row on the inboard side, and the number of the balls in the row on the outboard side is greater than that of the balls in the row on the inboard side, and wherein the ratio (PCDi/D) of the outer diameter D of the knuckle mount in the outer member relative to the pitch circle diameter PCDi in the row of the balls on the inboard side is chosen to be within the range of 0.66 to 0.80.

Mode (6):

In the wheel support bearing assembly as defined in Mode (6) above, the inner member includes a hub axle having an outboard end provided with the hub flange and an inboard end provided with an inner race mount that is radially inwardly stepped to provide a reduced diameter, and an inner race member mounted on the inner race mount.

Mode (7):

A wheel support bearing assembly including an outer member having an inboard end formed with a knuckle mount defined in an outer periphery thereof for engagement with a knuckle of an automotive suspension system and also having an inner periphery formed with a plurality of raceways, in which the raceway in the outer member on the inboard side is in its entirety or partly held in overlapping relation with an axial range in which the knuckle mount is defined, and an inner member having an outer periphery formed with raceways cooperable and aligned with the raceways in the outer member and also having a wheel fitting flange provided in an outboard end of the outer periphery thereof, and rows of balls interposed between the raceways in the outer member and the raceway in the inner member, respectively, wherein the inner diameter of the raceway on the inboard side in the outer member is chosen to be a maximum available value sufficient to obtain a required wall thickness in a region between the knuckle mount and the raceway on the inboard side and the balls of the row on the inboard side have a minimum available diameter sufficient to obtain a predetermined rolling fatigue life, and wherein the row of the balls on the outboard side utilizes the balls of the same diameter as that of the balls of the row on the inboard side and the diameter of the pitch circle depicted by the balls of the row on the outboard side is greater than that depicted by the balls of the row on the inboard side, and the number of the balls in the row on the outboard side is greater than that of the balls in the row on the inboard side.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly including:
    an outer member having an inner periphery formed with a plurality of raceways and an outer periphery formed with a vehicle body mounting portion;
    an inner member having an outer periphery formed with raceways cooperable and aligned with the raceways in the outer member;
    rows of rolling elements interposed between the raceways in the outer member and the raceway in the inner member, respectively, in which the outer periphery of the inner member is formed with a wheel fitting hub flange defined on an outboard side and the inner member includes a hub axle having an inner race mount defined on an inboard side and radially inwardly stepped to provide a reduced diameter; and
    an inner race member mounted on the inner race mount, with the raceways in the inner member defined in the hub axle and the inner race member, respectively,
    wherein an outer diameter of the hub axle as measured at a midpoint between the rows of the rolling elements on the outboard and inboard sides, respectively, is chosen to be greater than a minimum available diameter of the raceway on the inboard side, and
    the inner race member is formed with, on an outboard side of the inboard raceway thereof, a reduced diameter portion having an outer diameter smaller than the minimum diameter of the raceway on the inboard side.

2. The wheel support bearing assembly as claimed in claim 1, wherein a diameter of a pitch circle depicted by the rolling elements of the row on the outboard side is greater than the pitch circle of the rolling elements of the row on the inboard side.

3. The wheel support bearing assembly as claimed in claim 1, further comprising a thinned wall portion defined in a portion of the inner peripheral surface of the outer member between the raceways.

4. The wheel support bearing assembly as claimed in claim 1, wherein bearing portions on the outboard and inboard sides are in the form of an angular contact ball bearing and are held in back-to-back relation to each other.

5. The wheel support bearing assembly as claimed in claim 1, wherein the hub axle has an axial recess defined therein so as to extend axially inwardly from an outboard end face thereof to deplete a wall material, which recess has a depth deep enough to allow the axial recess to extend towards the inboard side past an axial position of the center of the rolling element in the hub axle.

6. The wheel support bearing assembly as claimed in claim 1, wherein bearing portions on the outboard and inboard sides are in the form of an angular contact ball bearing and are held in back-to-back relation to each other and wherein a portion of the raceway in the hub axle adjacent the inboard side is formed with a varying diameter portion of a diameter progressively decreasing to a value smaller than the minimum diameter of this raceway in the hub axle.

7. The wheel support bearing assembly as claimed in claim 6, wherein the varying diameter portion has an arcuate sectional shape, having a radius of curvature thereof greater than the radius of curvature of a sectional shape of the raceway in the hub axle.

8. The wheel support bearing assembly as claimed in claim 6, wherein the varying diameter portion has a tapered shape.

9. The wheel support bearing assembly as claimed in claim 1, wherein the rolling elements are balls;
   wherein the diameter of the pitch circle depicted by the balls of the row on the outboard side is greater than that depicted by the balls of the row on the inboard side, the balls of the row on the outboard side has the same diameter as that of the balls of the row on the inboard side, and the number of the balls in the row on the outboard side is greater than that of the balls in the row on the inboard side; and
   wherein the ratio of the diameter of the balls relative to the pitch circle diameter in the row of the balls on the inboard side is within the range of 0.14 to 0.25.

10. The wheel support bearing assembly as claimed in claim 9, wherein the inner member has the wheel fitting flange, the outer member has a knuckle mount defined on the inboard side for engagement with a knuckle of a suspension system, and the raceway in the outer member on the inboard side is in its entirety or partly held in overlapping relation with an axial range in which the knuckle mount is defined.

11. The wheel support bearing assembly as claimed in claim 1, wherein the rolling elements are balls;
   wherein the inner member has the wheel fitting flange, the outer member has a knuckle mount defined on the inboard side for engagement with a knuckle of a suspension system, and the raceway in the outer member on the inboard side is in its entirety or partly held in overlapping relation with an axial range in which the knuckle mount is defined, and
   wherein the diameter of the pitch circle depicted by the balls of the row on the outboard side is greater than that depicted by the balls of the row on the inboard side, the balls of the row on the outboard side has the same diameter as that of the balls of the row on the inboard side, and the number of the balls in the row on the outboard side is greater than that of the balls in the row on the inboard side, and
   wherein the ratio of the outer diameter of the knuckle mount in the outer member relative to the pitch circle diameter in the row of the balls on the inboard side is within the range of 0.66 to 0.80.

12. The wheel support bearing assembly as claimed in claim 1, wherein the rolling elements are balls;
   wherein the inner member has the wheel fitting flange, the outer member has a knuckle mount defined on the inboard side for engagement with a knuckle of a suspension system, and the raceway in the outer member on the inboard side is in its entirety or partly held in overlapping relation with an axial range in which the knuckle mount is defined;
   wherein the inner diameter of the raceway on the inboard side in the outer member is chosen to be a maximum available value sufficient to obtain a required wall thickness in a region between the knuckle mount and the raceway on the inboard side, the balls of the row on the inboard side have a minimum available diameter sufficient to obtain a predetermined rolling fatigue life; and
   wherein the row of the balls on the outboard side utilizes the balls of the same diameter as that of the balls of the row on the inboard side and the diameter of the pitch circle depicted by the balls of the row on the outboard side is greater than that depicted by the balls of the row on the inboard side, and the number of the balls in the row on the outboard side is greater than that of the balls in the row on the inboard side.

* * * * *